(12) United States Patent
Kahn et al.

US007704413B2

(10) Patent No.: US 7,704,413 B2
(45) Date of Patent: Apr. 27, 2010

(54) METHOD FOR THE PREPARATION OF A COMPOSITION OF NANOPARTICLES OF AT LEAST ONE CRYSTALLINE METAL OXIDE

(75) Inventors: Myrtil Kahn, Toulouse (FR); Miguel Monge, Toulouse (FR); André Maisonnat, Roquettes (FR); Bruno Chaudret, Vigoulet Auzil (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 897 days.

(21) Appl. No.: 10/551,948

(22) PCT Filed: Apr. 6, 2004

(86) PCT No.: PCT/FR2004/000850

§ 371 (c)(1),
(2), (4) Date: Oct. 6, 2005

(87) PCT Pub. No.: WO2004/092069

PCT Pub. Date: Oct. 28, 2004

(65) Prior Publication Data

US 2006/0245998 A1 Nov. 2, 2006

(30) Foreign Application Priority Data

Apr. 7, 2003 (FR) .................................. 03 04285

(51) Int. Cl.
*H01B 1/00* (2006.01)
(52) U.S. Cl. .............................. 252/500; 75/362; 423/1; 423/263; 423/299; 423/592.1; 423/634; 556/1
(58) Field of Classification Search ................ 252/500; 264/489; 423/263, 592.1, 634, 1, 299; 427/212, 427/216; 416/97 R; 516/33; 75/362; 556/1
See application file for complete search history.

(56) References Cited

U.S. PATENT DOCUMENTS

| 6,262,129 | B1 * | 7/2001 | Murray et al. ................. 516/33 |
| 6,395,053 | B1 * | 5/2002 | Fau et al. ....................... 75/362 |
| 6,562,403 | B2 * | 5/2003 | Klabunde et al. ............ 427/216 |
| 2004/0115124 | A1 * | 6/2004 | Woo et al. .................... 423/634 |
| 2004/0247503 | A1 * | 12/2004 | Hyeon ........................... 423/1 |
| 2006/0051505 | A1 * | 3/2006 | Kortshagen et al. ......... 427/212 |
| 2006/0061017 | A1 * | 3/2006 | Strouse et al. ............... 264/489 |
| 2007/0140851 | A1 * | 6/2007 | Hooper et al. ............. 416/97 R |
| 2007/0140951 | A1 * | 6/2007 | O'Brien et al. ........... 423/592.1 |
| 2008/0003159 | A1 * | 1/2008 | Cheon et al. ................. 423/263 |

FOREIGN PATENT DOCUMENTS

EP 0 947 245 10/1999

OTHER PUBLICATIONS

Nayral et al., "Synthesis of Tin and Tin Oxide Nanoparticles of Low Size Dispersity for Application in Gas Sensing," Chem. Eur. J., 6, No. 22, 2000, pp. 4082-4090.*
Rataboul et al., "Synthesis and characterization of monodisperse zinc and zinc oxide nanoparticles from the organometallic precursor [Zn(C6H11)2]," J. Organo Metallic Chem., 643-644, 2002, pp. 307-312.*
Cordente, N. et al. "New procedure towards well-dispersed nickel oxide nanoparticles of controlled size", C.R. Acad. Sci. Paris, Chimie/Chemistry 4 (2001) 143-148.
Khaleel, A. et al. "Ceramics", *Nanoscale Materials in Chemistry*, ed. K. J. Klabunde, ISBN 0-471-38395-3, 2001 John Wiley and Sons, Inc.
Rataboul, F. et al. "Synthesis and characterization of monodisperse zinc and zinc oxide nanoparticles from the organometallic precursor $[Zn(C_6H_{11})_2]$", Journal of Organometallic Chemistry 643-644 (2002) 307-312.
K. Soulantica, A. Maisonnat, M.-C. Fromen, M.-J. Casanove, P. Lecante, B. Chaudret: "Synthesis and self-assembly of Monodisperse Indium Nanoparticles Prepared from the Organometallic Precursor 'InCp!" Angewandte Chemie Int. Ed., vol. 40, No. 2, 2001, pp. 448-451, XP002266276 Weinheim the whole document.
C. Nayral, E. Viala, P. Fau, F. Senocq, J.-J. Jumas, A. Maisonnat, B. Chaudret: "Synthesis of Tin and Tin Oxide Nanoparticles of Low Size Dispersity for Application in Gas Sensing" Chemistry an European Journal, vol. 6, No. 22, 2000, pp. 4082-4090, XP002304770 Weinheim cited in the application the whole document.
K. Soulantica, A. Maisonnat, F. Senocq, M.-C. Fromen, M.-J. Casanove, B. Chaudret: "Selective Synthesis of Novel In and In3Sn Nanowires by an Organometallic Route at Room Temperature" Angewandte Chemie Int. Ed., vol. 40, No. 16, 2001, -2984 pp. 2983-2986, XP002266277 weinheim the whole document.

(Continued)

*Primary Examiner*—Mark Kopec
*Assistant Examiner*—Khanh Tuan Nguyen
(74) *Attorney, Agent, or Firm*—Young & Thompson

(57) ABSTRACT

The invention relates to a method for the preparation of a composition of nanoparticles of at least one crystalline metal oxide from at least one organometallic precursor. One precursor(s) which can react spontaneously to oxidation is selected; a liquid solution of the precursor(s) is produced in a solvent non-aqueous medium, and the liquid solution is placed in contact with at least one oxidant in adapted reactional conditions in order to directly result in the production of nanoparticles of crystalline metal oxide(s). The invention also relates to a composition of nanoparticles obtained in the form of a colloidal liquid solution.

18 Claims, 17 Drawing Sheets

OTHER PUBLICATIONS

C. Nayral, E. Viala, V. Colliére, P. Fau, F. Senoco, A. Maisonnat, B. Chaudret: "Synthesis and use of a novel Sno2 nanomaterial for gas sensing" Applied Surface Science, vol. 164, 2000, pp. 219-226, XP002266278 p. 222, line 33-line 41.

C. Nayral, T. Ould-Ely, A. Maisonnat, B. Chaudret, P. Fau, L. Lescouzéres, A. Peyre-Lavigne: "A Novel Mechanism for the Synthesis of Tin/Tin oxide nanoparticles of low size Dispersion and of nanostructured Sn02 for the sensitive layers of Gas Sensors" Advanced Materials, vol. 11, No. 1, 1999, pp. 61-63, XP002266279 figure 1.

Cordente N et al: "Synthesis and Magnetic Properties of Nickel Nanorods" Nano Letters, American Chemical Society, Washington, DC, US, vol. 1, No. 10, Aug. 30, 2001, pp. 565-568, XP001098945 ISSN: 1530-6984 the whole document.

Ding Y et al: "Nanoscale Magnesium Hydroxide and Magnesium Oxide Powders: Control Over Size, Shape, and Structure via Hydrothermal Synthesis" Chemistry of Materials, American Chemical Society, Washington, US, vol. 13, No. 2, Feb. 1, 2001, pp. 435-440, XP001005173 ISSN: 0897-4756 table 3.

Database WPI Section Ch, Week 20029 Derwent Publications Ltd., London, GB; AN 2000-329726 XP002266280 & CN 1 245 777 A (Guangzhou Inst Chem Chinese Acad) Mar. 1, 2000 abstract.

* cited by examiner 5 nm 10 nm

METHOD FOR THE PREPARATION OF A COMPOSITION OF NANOPARTICLES OF AT LEAST ONE CRYSTALLINE METAL OXIDE

This is a 371 National Stage application of International application no. PCT/FR2004/000850, filed Apr. 6, 2004, which claims priority to French application no. 03/04285, filed Apr. 7, 2003. The entire contents of the above-referenced applications are hereby incorporated by reference in their entirety.

The invention relates to a process for the preparation of a composition of nanoparticles of at least one crystalline metal oxide by chemical reaction of at least one organometallic precursor. It relates in particular to the preparation of a composition of dispersed nanoparticles of at least one crystalline metal oxide having at least substantially uniform forms and dimensions. It extends to novel compositions of dispersed (colloidal) nanoparticles, having at least substantially uniform forms and dimensions, of at least one crystalline metal oxide that are obtained by this process.

BACKGROUND OF THE INVENTION

In view of their specific properties which open the way for many potential industrial applications, crystalline metal oxides, especially in the form of nanoparticles, have for many years been the subject of intensive research. The document "Ceramics" Abbas Khaleel and Ryan M. Richards, Nanoscale Materials in Chemistry, Kenneth J. Klabunde, 2001, John Wiley and Sons, pp 85-120, depicts a prior art of the various methods hitherto envisaged for the preparation of nanoparticulate crystalline metal oxides, namely:

physical and/or aerosol methods (vapour or gas condensation; jet pyrolysis; thermochemical or flame decomposition; thermal evaporation; vaporization in vacuo; laser evaporation); these physical methods generally produce low yields, may generate undesirable products, require elevated temperatures and complex and costly apparatus;

chemical methods:

sol-gel: this method consists in carrying out the hydrolysis of precursors of the alcoholate type in water and/or an alcohol in the presence of a catalyst (an acid or base which allows the hydrolysis of the alkoxysilane to silanol or silyl ether to be accelerated, especially a mineral acid or a mineral base such as HCl, NaOH, KOH), producing, by condensation, a gel of metal hydroxides, then, by drying of the gel, a powder, and finally, by subsequent calcination, oxides; accordingly, this method requires many successive steps including thermal treatments and generally yields only materials having a nanostructure, not well-dispersed nanoparticles;

microemulsion: although promising, this method produces low yields and requires large quantities of solvent, a biphase reaction and calcinations;

chemical synthesis at low temperature in solution, and precipitation: these methods require final separating steps in vacuo and/or calcination at high temperature and do not allow the form and size of the particles to be controlled, the particles generally being undispersed;

mechanochemical synthesis: this method does not permit the preparation of dispersed nanoparticles having uniform and predetermined forms and dimensions.

In addition, EP-0947245 describes a process for the preparation of metal colloids from an organometallic precursor ($[Sn(N(CH_3)_2)_2]_2$ for tin) dissolved in a slightly hydrated solvent, such as anisole or commercial toluene, heating the solution, which is maintained under an inert gas, to at least 130° C. in order to bring about decomposition of the precursor, and then suppressing organic by-products by at least three steps of washing with pure solvent. Nanoparticles of tin surrounded by a protective film of tin oxide are obtained. This metal colloid can be used to prepare a sensitive layer of tin oxide. To this end, a layer of metal colloid is first formed, for example by the spin-on deposition method, and is subjected to oxidation in two steps, a first step at 200° C. and a second step at 650° C., and then to annealing at 450° C. to form a layer of particles of crystalline tin oxide having a diameter of 0.02µ. In this manner there is obtained a sensitive layer of spherical agglomerated tin oxide particles.

The publications "Synthesis and characterization of monodisperse zinc and zinc-oxide nanoparticles from the organometallic precursor [$Zn(C_6H_{11})_2$]" F. Rataboul et al., Journal of Organometallic Chemistry 643-644 (2002) 307-312; and "New procedure towards well-dispersed nickel oxide nanoparticles of controlled size" N. Cordente et al., C. R. Acad. Sci. Paris, chimie/chemistry 4 (2001) 143-148 describe the preparation of colloids of mixed metal particles (Zn/ZnO or Ni/NiO) having a metal core and a layer of oxide, by thermal decomposition, under an inert gas, of an organometallic precursor in a manner similar to EP-0947245. The publication of F. Rataboul teaches that nanoparticles of Zn/ZnO dispersed in PVP (polyvinylpyrrolidone) can be obtained. The particles obtained in the absence of PVP, that is to say which are not dispersed, are oxidized in the air for 3 hours at 300° C. and then for 3 hours at 600° C. There is obtained a phase of nanoparticles of pure zinc oxide having a hexagonal wurtzite structure, without coalescence but not dispersed. The publication of N. Cordente et al. describes the preparation of Ni/NiO nanoparticles dispersed in PVP and indicates that preliminary tests have been carried out for the oxidation of these particles at 100° C. (below 130° C. in order to avoid decomposition of the dispersion polymer PVP) for two weeks. However, this document admits that this oxidation does not allow nanoparticles of pure NiO oxide to be obtained, even though the results obtained are considered by the authors to be promising. Nevertheless, it is found that if the oxidation treatment is sufficiently intensive to produce oxide particles, the dispersion polymer is destroyed and the oxidized particles are no longer in the dispersed state.

Accordingly, none of the known methods mentioned above permits the direct preparation of nanoparticles of pure crystalline metal oxide(s). Furthermore, none of the known methods permits the preparation of such nanoparticles in dispersed form and having homogeneous, at least substantially uniform forms and dimensions, that is to say corresponding to a unimodal distribution (distributed around a single principal mean value), and especially substantially monodisperse (that is to say with weak dispersion around the mean value).

Moreover, most of the known methods are laborious, require complex equipment and a high level of technology and/or numerous successive steps, including thermal treatment steps and separating steps (washing, purification, etc.), produce large quantities of polluting by-products or waste (especially solvents), and are not very suitable for exploitation under profitable economic conditions on an industrial scale.

In addition, none of the known methods permits the preparation of nanoparticles of crystalline metal oxide(s) which are in dispersed form and the form of which may have form anisotropy (non-spherical), for example an elongated form (rods, threads, ribbons, etc.). In some industrial applications, however, it is important to obtain nanoparticles having uniform and controlled forms and dimensions, which are in dispersed form, and which may have form anisotropy (especially an elongated form).

SUMMARY OF THE INVENTION

The invention relates to a composition of at least one crystalline metal oxide, especially in the form of nanoparticles in dispersed form and having at least substantially uniform forms and dimensions. The invention also relates to a process for the preparation of such a composition having forms and dimensions of the particles which can be predicted and controlled in a precise manner, especially which may have form anisotropy, in particular may be elongated (discs, ribbons, threads, rods, spheres, etc.). The invention aims also to permit the preparation of such a composition which may be in the form of a colloidal liquid solution.

DETAILED DESCRIPTION OF THE INVENTION

Figure 1:
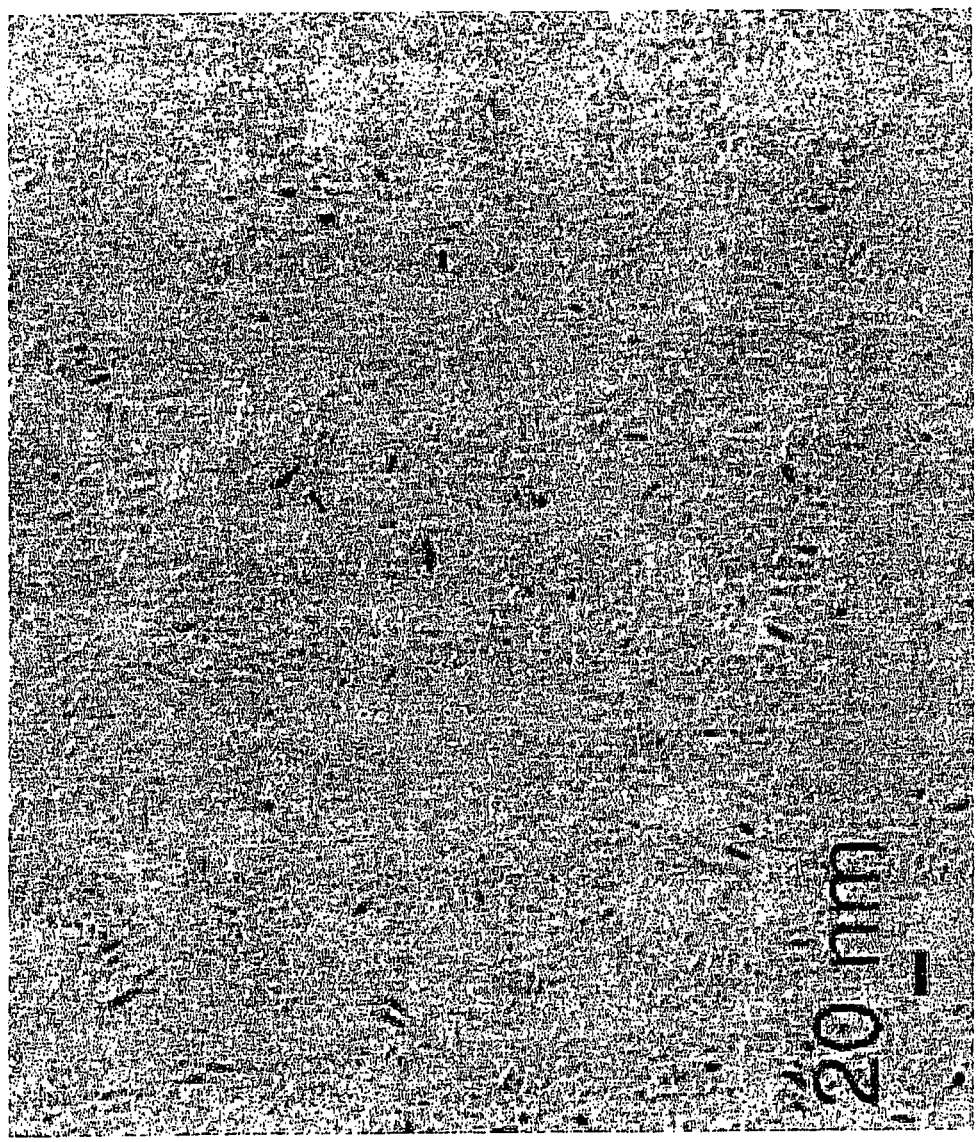
FIG. 1 depicts nanorods having an average size of 10 nm×5 nm obtained using the experiments in Example 1 showing the effect of the initial concentration of the resulting nanoparticles.

Throughout this text, the following terminology is used:

nanoparticle: any particle, whatever its form, having at least one width and a thickness that are both less than 100 nm, typically from 1 nm to 20 nm;

organometallic precursor: any molecule or coordination compound containing at least one organic group bonded to at least one metal atom (transition metal or main group element) by a carbon atom or a hetero atom, excluding oxygen (selected especially from N, P, As, Si, S, Se, Te), of that organic group; an organometallic precursor that is spontaneously reactive to oxidation is a precursor that is converted exothermically into an oxide when it is brought into sole contact with at least one oxidizing agent such as ambient air;

oxidizing agent: any agent permitting the conversion of a precursor into an oxide by a chemical reaction, called an oxidation reaction;

non-aqueous solvent medium: any composition capable of forming a liquid solution when it is brought into contact with at least one compound such as an organometallic precursor; this composition is non-aqueous in the sense that water does not act as a solvent agent in the composition, which may nevertheless comprise traces of water; it may be in the liquid state initially, or alternatively it may pass into the liquid state only after contact with the compound(s) to be dissolved; it may be simple, that is to say formed of only one compound, or complex and comprise a plurality of compounds; in particular, it may comprise not only one or more compound(s) acting as solvent agent but also any other compound that is not consumed by the oxidation reaction and is substantially neutral towards the dissolution of the organometallic precursor(s) and that does or does not play a part in the oxidation reaction;

colloidal liquid solution: any clear solution of solid nanoparticles dispersed in a liquid (a colloidal liquid solution diffuses light).

Within this context, the invention aims to propose a composition of at least one crystalline metal oxide, especially in the form of nanoparticles in dispersed form and having at least substantially uniform forms and dimensions, and a process for the preparation of such a composition.

More particularly, the invention aims also to permit the preparation of such a composition having forms and dimensions of the particles which can be predicted and controlled in a precise manner, especially which may have form anisotropy, in particular may be elongated (discs, ribbons, threads, rods, spheres, etc.). The invention aims also to permit the preparation of such a composition which may be in the form of a colloidal liquid solution.

The invention also aims in particular to propose an extremely simple preparation process which does not require complex apparatus, which permits the direct preparation of dispersed nanoparticles of crystalline metal oxide(s) in a small number of steps, and which is compatible with exploitation on an industrial scale under satisfactory economic conditions. The invention aims in particular to propose a process which does not involve thermal treatment and which does not produce large quantities of polluting waste.

To this end, the invention proposes a process for the preparation of a composition of nanoparticles of at least one crystalline metal oxide from at least one organometallic precursor, in which process:

there is(are) selected (a) precursor(s) that is(are) spontaneously reactive to oxidation, a liquid solution of the precursor(s) in a non-aqueous solvent medium is produced, the liquid solution is brought into contact with at least one oxidizing agent under reaction conditions suitable for bringing about directly the production of nanoparticles of crystalline metal oxide(s).

The chosen reaction conditions comprise especially:

the choice of the non-aqueous solvent medium;

the initial concentrations;

the reaction temperature;

the reaction pressure.

The process of the invention accordingly consists in carrying out a chemical reaction of direct oxidation of at least one organometallic precursor in liquid solution. It differs from sol-gel processes especially in that the direct oxidation of the spontaneously reactive precursor(s), which is(are) not (an) alcoholate(s), is carried out in a non-aqueous medium, without a catalyst (such as a mineral acid or a mineral base), without passing through a step of controlled hydrolysis leading to the formation of hydroxides forming a gel (inorganic polymer) and without the need for a subsequent calcination step to obtain the oxides in the crystalline state. In a process according to the invention, the nanoparticles of crystalline metal oxide(s) are in fact obtained by simply bringing the liquid solution into contact with an oxidizing medium, without any subsequent step, especially without a calcination step.

The inventors have found, surprisingly, that the metal oxide in the crystalline state can be obtained directly in the form of nanoparticles without passing through metal particles, starting from an oxidized organometallic precursor in liquid solution, provided that a precursor that is spontaneously reactive to oxidation is chosen and with suitable reaction conditions for obtaining gentle oxidation. The process according to the invention also allows the form, the homogeneity of the nanoparticles (all the same form), the size and the size distribution of the nanoparticles to be controlled, in a single step in a solvent medium.

Advantageously and according to the invention, the oxidation is carried out at ambient pressure and at a temperature of from 0° C. to 200° C.

In the majority of cases, it is possible to carry out the oxidation at ambient pressure and at a temperature below 50° C., especially at ambient temperature. Accordingly, the process according to the invention is extremely simple.

No clear explanation can be given by the inventors for these surprising results, which run counter to previous knowledge.

In particular, it was hitherto considered necessary, in order to obtain nanoparticles of crystalline semi-conductor materials, to pass through a composition of metal nanoparticles. In fact, crystal growth requires either reversible passage from a fluid phase (solution, melt or vapour) to the solid phase, or considerable mobility in the solid phase, in order to allow the atoms, ions and molecules to adopt positions corresponding to the development of crystal lattices. However, although a composition of purely metal nanoparticles permits the transport of atoms and coalescence phenomena within it, and behaves like a "pseudo-molten" solid, that is not the case with semi-conductor materials such as oxides, which form rigid crystal lattices that prevent such transport at low temperature.

Accordingly, there was nothing to indicate that it would be possible to obtain nanoparticles of crystalline metal oxide directly.

On the contrary, the growth of semi-conductor crystals, especially of oxides, was hitherto considered to require the application of high temperatures (more than 1000° C. in the molten state or more than 500° C. in the case of organometallic chemical vapour deposition (OMCVD) processes).

Accordingly, it was completely unforeseeable to obtain nanoparticulate crystalline metal oxide(s) simply by bringing a liquid solution of at least one organometallic precursor into contact with ambient air.

The extremely simple, inexpensive process according to the invention, in a single reaction step, accordingly acquires considerable and decisive advantages over the totality of the processes hitherto envisaged for obtaining crystalline metal oxides.

Moreover, a posteriori, the inventors have put forward the hypothesis that the surprising results obtained with the process of the invention might be explained in part by the fact that the oxidation reaction is furthered by the exothermic nature of the decomposition of the organometallic precursor. Thus, contrary to what was assumed hitherto, it is possible, in a single step, to decompose an organometallic precursor to form an oxide directly, and it would be the generation of heat from the decomposition which would allow a crystalline oxide to be obtained.

In view of the above, the process according to the invention may be employed using all elements for which there is an organometallic precursor that is spontaneously reactive to oxidation and which can be placed in a liquid solution.

Among these elements there may be mentioned: zinc, cadmium, boron, aluminum, gallium, indium, thallium, germanium, tin, titanium, zirconium, hafnium, the lanthanides (Ce, Pr, Nd, Sm, Eu, Gd, Tb, Dy, Ho, Er, Tm, Yb, Lu), scandium, yttrium, silicon, bismuth and the other transition metals.

By way of examples of organometallic precursors that are spontaneously reactive to oxidation which can be used in a process according to the invention there may be mentioned complex coordination compounds comprising at least one of the above-mentioned elements and at least one group selected from: amides, alkyls, aryl, cyclopentadienyls, olefins, polyolefins, alkynes, alkynines, silyls.

Even more surprising is the fact that it is possible to obtain, in a selective, reproducible and quantitative manner, the crystalline metal oxide in the form of nanoparticles which are perfectly dispersed (not agglomerated) and have forms and dimensions that are at least substantially uniform, that is to say in accordance with a unimodal distribution, especially substantially homogeneous (weak dispersion), and which may even be monodisperse.

Furthermore, the inventors have found that the solvent medium and its structure allow the size, form and size distribution of the nanoparticles to be controlled.

To this end, advantageously and according to the invention, said solvent medium comprises at least one compound, called a ligand, selected from the bases and acids.

It has been found that it is possible precisely to vary and to control the form and dimensions of the resulting nanoparticles of oxide(s) according to the choice of the ligand(s) and the various reaction conditions employed.

Such ligands are sometimes recommended in processes for the preparation of purely metal nanoparticles. It is known that, in this case, they may affect the form of the resulting metal nanoparticles. Nevertheless, because, as indicated above, nanoparticulate crystalline metal oxides do not have the same properties of pseudo-fluidity as nanoparticulate metals, this teaching cannot be transposed in the case of the direct oxidation of the organometallic compound. In this case too, there is no clear explanation for the influence of such a ligand within the scope of the present invention. In the case of zinc, the inventors have found that an amine ligand (for example hexadecylamine) present in the liquid solution before the start of the oxidation reaction may bring about the formation of an intermediate compound with the organometallic precursor, which intermediate compound would be attacked by the oxidizing agent and would produce forms of crystalline oxide nanoparticles different from those which would be obtained if the organometallic precursor were attacked directly by the oxidizing agent.

In the process according to the invention there is preferably used an equimolar amount of ligand(s) relative to the amount of metal atoms of the precursor(s). In other words, a stoichiometric amount of ligand(s) is used relative to the corresponding metal atoms of the precursor(s).

Advantageously and according to the invention, at least one ligand that is not volatile at the reaction temperature is chosen, this ligand acting as dispersing agent for the composition produced in the solvent medium. Accordingly, the nanoparticles of oxide(s) are spontaneously in the dispersed state (colloid) in the final composition.

The liquid solution can be left to stand in the presence of the ligand(s) under the absence of oxidizing agent for a predetermined period before the oxidation is carried out. This period may be, for example, several hours, especially of the order of from 10 hours to 20 hours.

By way of variation, the oxidation can be carried out immediately after the formation of the liquid solution. Whether or not the solution is left to stand also has an effect on the form and/or size of the resulting nanoparticles. For example, in the case of zinc oxide, without a standing period, nanoparticles of smaller dimensions are obtained.

In order to obtain elongated nanoparticles, at least one aliphatic organic compound (saturated or unsaturated), especially containing an unbranched aliphatic chain having from 6 to 20 carbon atoms, is used as ligand. Advantageously and according to the invention there is used at least one ligand selected from the group of the amines, especially primary amines (although good results can also be obtained with secondary or tertiary amines), acids, especially carboxylic acids, thiols, phosphorus derivatives and ethers. Advantageously and according to the invention there is used at least one ligand selected from the group comprising hexadecylamine, dodecylamine, octylamine, dodecylthiol, octanoic acid, oleic acid, lauric acid.

Advantageously and according to the invention, at least one base and at least one acid are chosen as ligands. Advantageously and according to the invention there is used at least one amine as base, especially a primary amine as mentioned above, and at least one carboxylic acid.

The use of an acid/base pair allows especially supercrystals of nanoparticles to be obtained, that is to say an organisation of the nanoparticles in a solid lattice similar to a crystal lattice. The molar proportions of acid, base and precursor may vary. Supercrystals of nanoparticles of ZnO have been obtained in THF with molar proportions acid/base/precursor of 0.5/1/1. In addition, nanoparticles of ZnO have been obtained in the absence of THF with the following molar proportions of oleic acid/octylamine/precursor: 1/2/1; 0.5/2/1; 2.5/5/1; 0.5/5/1.

Advantageously and according to the invention, the non-aqueous solvent medium is also non-alcoholic, that is to say is additionally free of any compound having reactive hydroxyl functions, in order to avoid any formation of hydroxide. In particular, the non-aqueous solvent medium is advantageously free (apart from traces) of alcohol functions and is therefore free of alcohol compound (primary, secondary to tertiary).

Advantageously and according to the invention, said solvent medium comprises at least two separate compounds. In particular, advantageously and according to the invention, said solvent medium comprises at least one ligand and at least one compound that is volatile under the reaction conditions and gradually evaporates during the oxidation. In an advantageous embodiment, said solvent medium is formed of THF and an aliphatic primary amine. The relative proportions of THF and primary amine may vary from 100%-0% to 0%-100%; depending on the chosen proportion, the form and/or size of the resulting nanoparticles of crystalline metal oxide(s) will vary.

Other compounds acting as solvent may be envisaged, for example anisole, heptane, toluene, etc. The choice depends in particular on the precursor(s) used and the metal oxide(s) formed.

In addition, it is possible according to the invention to use at least one ligand that is capable of forming a liquid solution with the precursor(s) when it is brought into contact with the precursor(s). Accordingly, the ligand(s) also act(s) as solvent agent(s) for the liquid solution, and it is not necessary to add another solvent agent specific to the solvent medium. For example, octylamine is liquid at ambient temperature. Likewise, some precursors that are in the solid state at ambient temperature and some ligands that are solid at ambient temperature, such as hexadecylamine, may form by simple mutual contact by mixing a liquid solution. Furthermore, with a ligand that is solid at ambient temperature, and if the oxidation residue(s) ("oxidation residue" means any product of the oxidation reaction other than the metal oxide(s) and the solvent medium) is(are) volatile or solid, the composition obtained after oxidation may return spontaneously to the solid state because the precursor that forms the liquid solution with the ligand has disappeared.

Advantageously and according to the invention, each precursor is so chosen that each oxidation residue formed from that precursor is volatile under the reaction conditions. Accordingly, in a process according to the invention, the oxidation reaction produces only solid particles of metal oxide(s) and (a) volatile organic residue(s). With a volatile solvent medium, and when the oxidation residue(s) is(are) volatile, the composition resulting from the oxidation reaction is solid. It can be taken up in a different solvent medium and then forms a colloidal liquid solution.

Advantageously and according to the invention there is used at least one oxidizing agent selected from dioxygen, water vapour, organic oxidizing agents, other non-organic oxidizing agents.

Examples of organic oxidizing agents which may be mentioned include organic hydroperoxides and amine oxides, such as trimethylamine oxide. Examples of non-organic oxidizing agents which may be mentioned include hydrogen peroxide, phosphorus oxide, sulfur oxide, nitrogen dioxide, ozone, chlorine dioxide, and metal complexes carrying at least one oxygen atom (for example metal-peroxide complexes, metal-oxide complexes, metal-hydroperoxide complexes, metal-superoxide complexes, etc.).

Advantageously and according to the invention, the oxidation is carried out without stirring the liquid solution. The traces of water which may be present in the liquid solution can act as oxidizing agent. The liquid solution is also brought into contact with atmospheric air. In particular, in an advantageous embodiment according to the invention, a volatile solvent agent and at least one organometallic precursor that forms a volatile oxidation residue are used, and the liquid solution is left in contact with ambient air without stirring. The solvent agent gradually evaporates as the air oxidizes the precursor in solution, and the oxidation residue other than the metal oxide evaporates. In reality, it is possible for the oxidation to be due solely to the dissolved traces of water coming from the starting volatile solvent agent and the ambient air (which is still moist). There is finally obtained a solid composition of metal oxide (optionally with each ligand at the surface of the nanoparticles).

Oxidizing agents other than dissolved traces of water and/or ambient air may be used, especially water vapour, pure dioxygen, etc. Nevertheless, it is an advantage of the process of the invention that the spontaneous production of nanoparticles of crystalline oxide(s) is possible simply by contact with ambient air.

Advantageously and according to the invention, zinc dicyclohexyl $Zn(C_6H_{11})_2$, commonly designated $ZnCy_2$, is chosen as precursor for the preparation of nanoparticles of crystalline zinc oxide. In the presence of hexadecylamine as ligand in an equimolar proportion with the precursor in THF, and by carrying out the oxidation using air at ambient temperature after standing for 17 hours beforehand, a homogeneous sample of dispersed, elongated nanoparticles of crystalline zinc oxide (zincite phase) having a width of 5 nm and a length of 15 nm and having a narrow size distribution was obtained. These semi-conductor particles are also photoluminescent. Such nanoparticles which are soluble in an organic medium are of considerable practical industrial value.

Advantageously and according to the invention, a precursor from tin bis(bis(dimethylamide)) $[Sn(N(CH_3)_2)_2]_2$ and tin dicyclopentadienyl $Sn(C_5H_5)_2$ is chosen for the preparation of nanoparticles of crystalline tin oxide.

Advantageously and according to the invention, indium cyclopentadienyl $In(C_5H_5)$ is chosen for the preparation of indium oxide.

Advantageously and according to the invention, at least two separate precursors from the group formed by zinc dicyclohexyl $Zn(C_6H_{11})_2$, tin bis(bis(dimethylamide)) $[Sn(N(CH_3)_2)_2]_2$, tin dicyclopentadienyl $Sn(C_5H_5)_2$ and indium cyclopentadienyl $In(C_5H_5)$ are chosen for the preparation of a mixed metal oxide.

The invention makes it possible to obtain a composition of nanoparticles of at least one crystalline metal oxide in the form of a colloidal liquid solution and having forms and dimensions corresponding to a unimodal distribution. No process known prior to the present invention permitted such a composition to be obtained. In particular in the prior art, it is not possible in practice to obtain such a composition of crystalline oxide(s) from a composition of pure or mixed dispersed metal nanoparticles.

Advantageously and according to the invention, the nanoparticles have form anisotropy (they are not spherical). Advantageously and according to the invention, the nanoparticles have an elongated form, with an average width of less than 50 nm and an average length of greater than twice the average width. Advantageously and according to the invention, the nanoparticles have an average width of from 2 nm to 7 nm and an average length of from 10 nm to 20 nm. Advantageously and according to the invention, the composition is composed of nanoparticles of crystalline zinc oxide having a hexagonal structure free of crystalline hydroxide.

The invention relates also to a process and a composition characterized in combination by all or some of the features mentioned hereinabove or appearing hereinbelow.

Further aims, features and advantages of the invention will become apparent upon reading the Examples which follow and from the accompanying FIGS. 1 to 18, which show microscopic views of compositions according to the invention obtained in the Examples.

General Protocol:

An equimolar liquid solution of the precursor(s) and the ligand(s) is prepared under an argon atmosphere. The concentration of each starting compound in the solution is generally 0.042 mol·l$^{-1}$, but it may be adjusted in dependence on the size of the desired nanoparticles. The solution is left in the absence of light for a period d1 (for example 17 hours), without stirring and still under argon (without contact with an oxidizing agent). The waiting time d1 can be adjusted in dependence on the size of the desired nanoparticles. At the end of the waiting time d1 at rest, the solution is brought into contact with ambient air and ambient humidity. It remains in contact with ambient air and humidity for a period d2, which generally corresponds to the time required for the solvent to evaporate completely, when the solvent is sufficiently volatile at ambient temperature. In the case where the solvent has not evaporated completely after several days, it is noted that nanoparticles of crystalline metal oxide have formed. When the solvent is sufficiently volatile and has evaporated completely, a solid product corresponding to a sample of crystalline metal oxide is obtained. In the particular case of ZnO, when the solvent is not sufficiently volatile to have evaporated completely, the formation of nanoparticles can be verified by irradiating the solution under UV ($\lambda$=312 nm), the solution becoming luminescent. In general, all the colloidal liquid solutions obtained from ZnO have luminescent properties. When a solid sample is obtained, the crystalline phase obtained can be verified by powder diffraction of the sample. In the case of ZnO, the resulting diffractogram corresponds to ZnO in the hexagonal zincite phase having the spacer group $P_{63}$ mc. Additional diffraction peaks correspond to organic species. These species have been characterized by NMR in solution and correspond to the ligand(s) present at the surface of the particles. In the case of colloidal liquid solutions, the crystallinity of the nanoparticles can be verified by electronic diffraction of the samples deposited on the microscopy grating. In all the examples, crystalline nanoparticles have been obtained. The microscopy gratings are prepared by depositing a drop of the colloidal liquid solution on the grating. The use of transmission electron microscopy, TEM, also allows the size, form and homogeneity of the nanoparticles formed to be observed. In all the examples it has been possible to obtain colloidal liquid solutions. The surface state of the nanoparticles was studied by NMR in solution, and the presence of the ligand(s) introduced into the reaction medium was noted. In the case of amines, it has been possible to demonstrate coordination via the $NH_2$-function. The nanoparticles synthesised by this method formed entities which behave like any conventional chemical product and possess, for example, a concentration at saturation at which passage from a colloidal solution to a turbid suspension occurs. This concentration is intrinsic to each system. Starting from these colloidal solutions it is possible to form monolayers of nanoparticles which have a tendency to self-organisation.

EXAMPLE 1

In this Example, the effect of the initial concentration on the resulting nanoparticles is evaluated.

Figure 2:
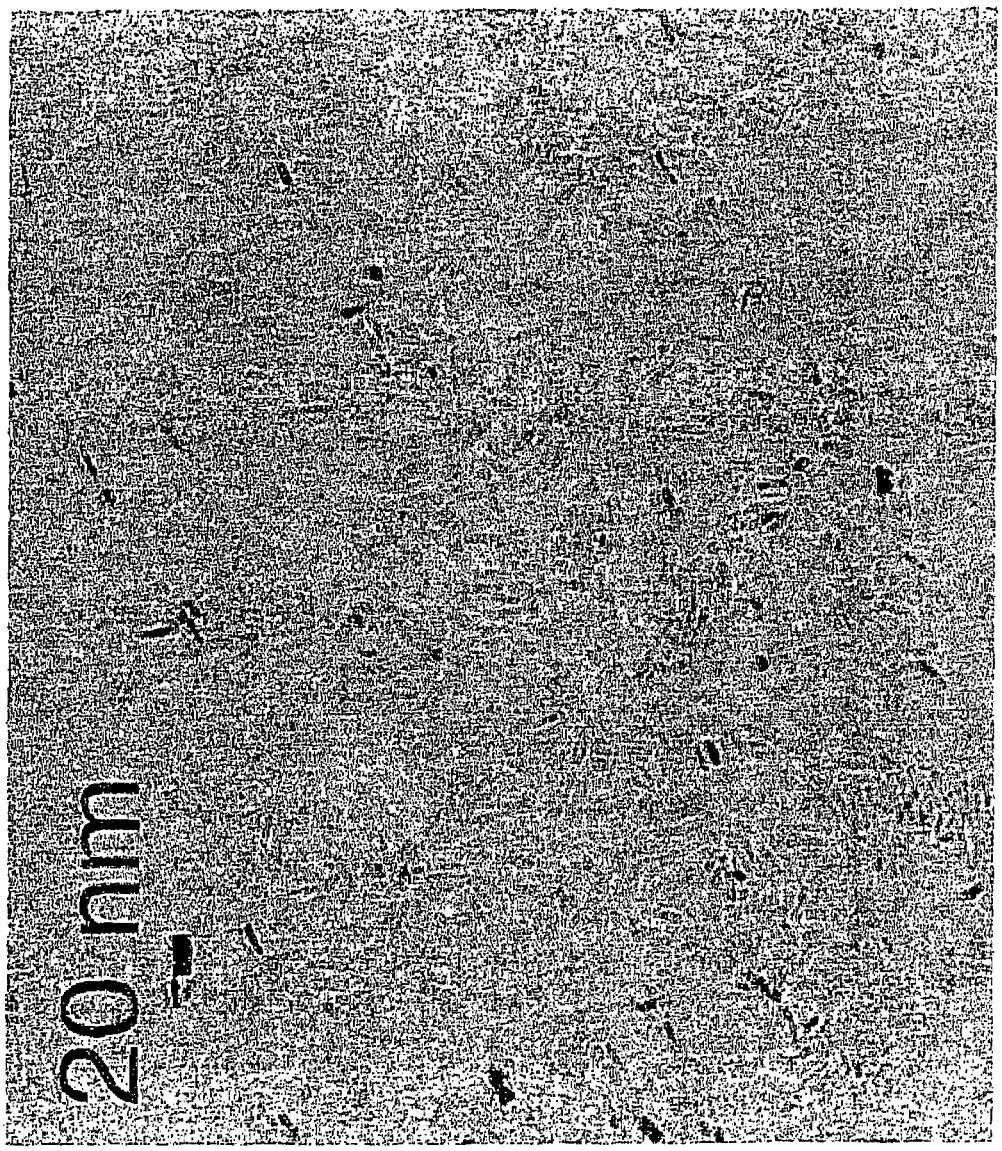
FIG. 2 depicts nanorods of 15 nm×5 nm obtained using the experiments in Example 1 but with a starting solution having a precursor concentration of 0.125 mol·l$^{-1}$.
Figure 3:
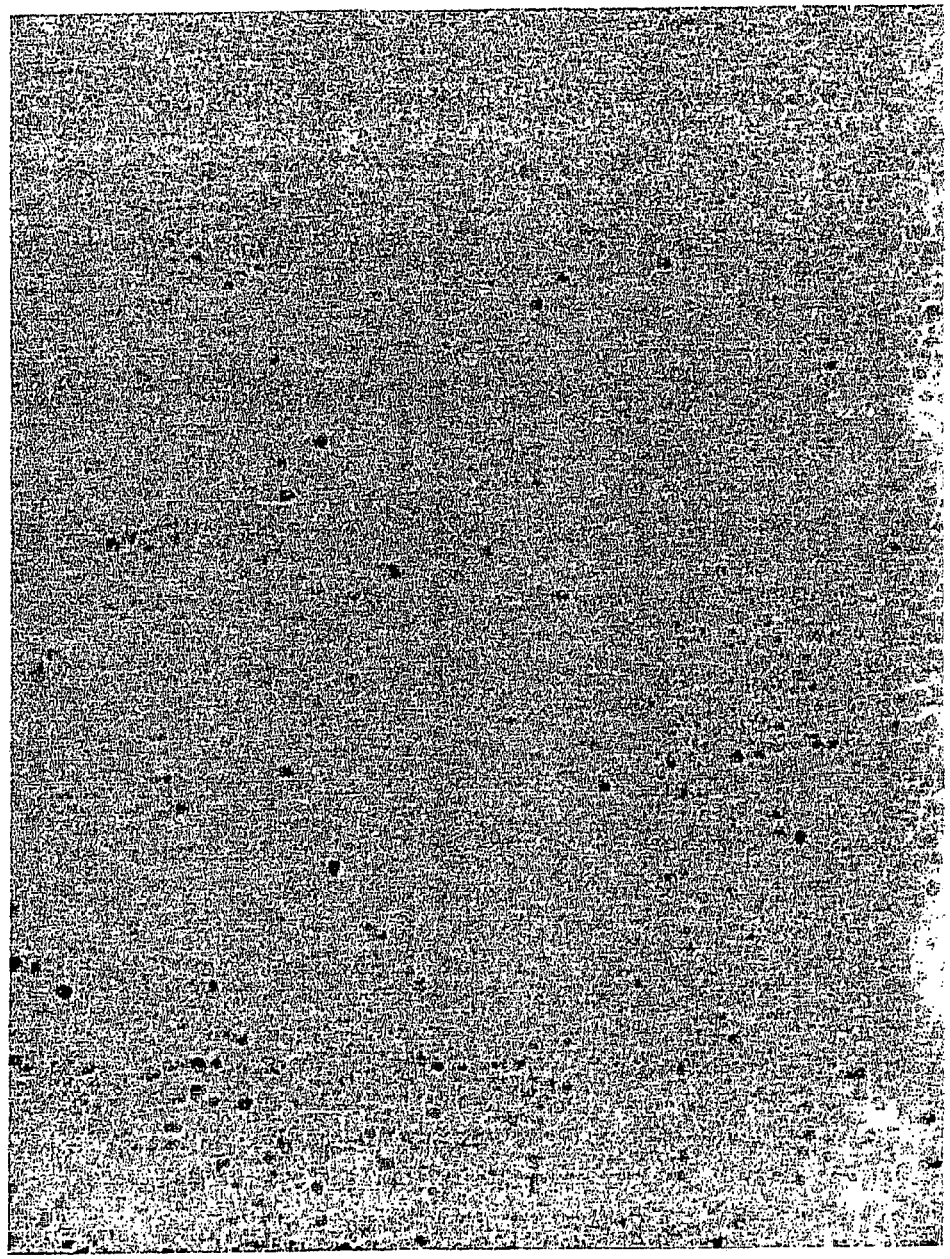
FIG. 3 depicts nanospheres of 13 nm obtained using toluene in place of THC to form the starting material in the experiment of Example 2.
Figure 4:
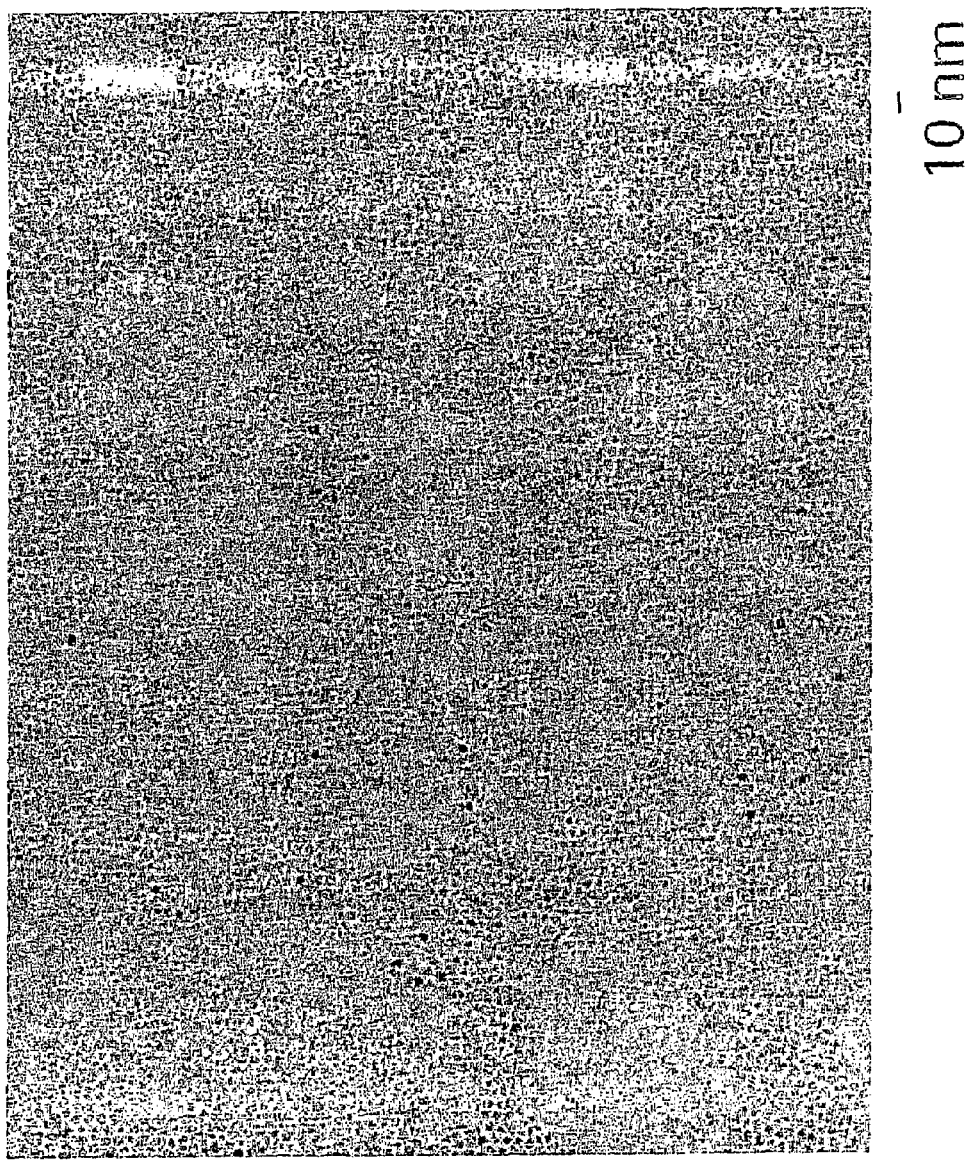
FIG. 4 depicts nanospheres of 7 nm obtained using heptane in place of THC to form the starting material in the experiment of Example 2.
Figure 5:
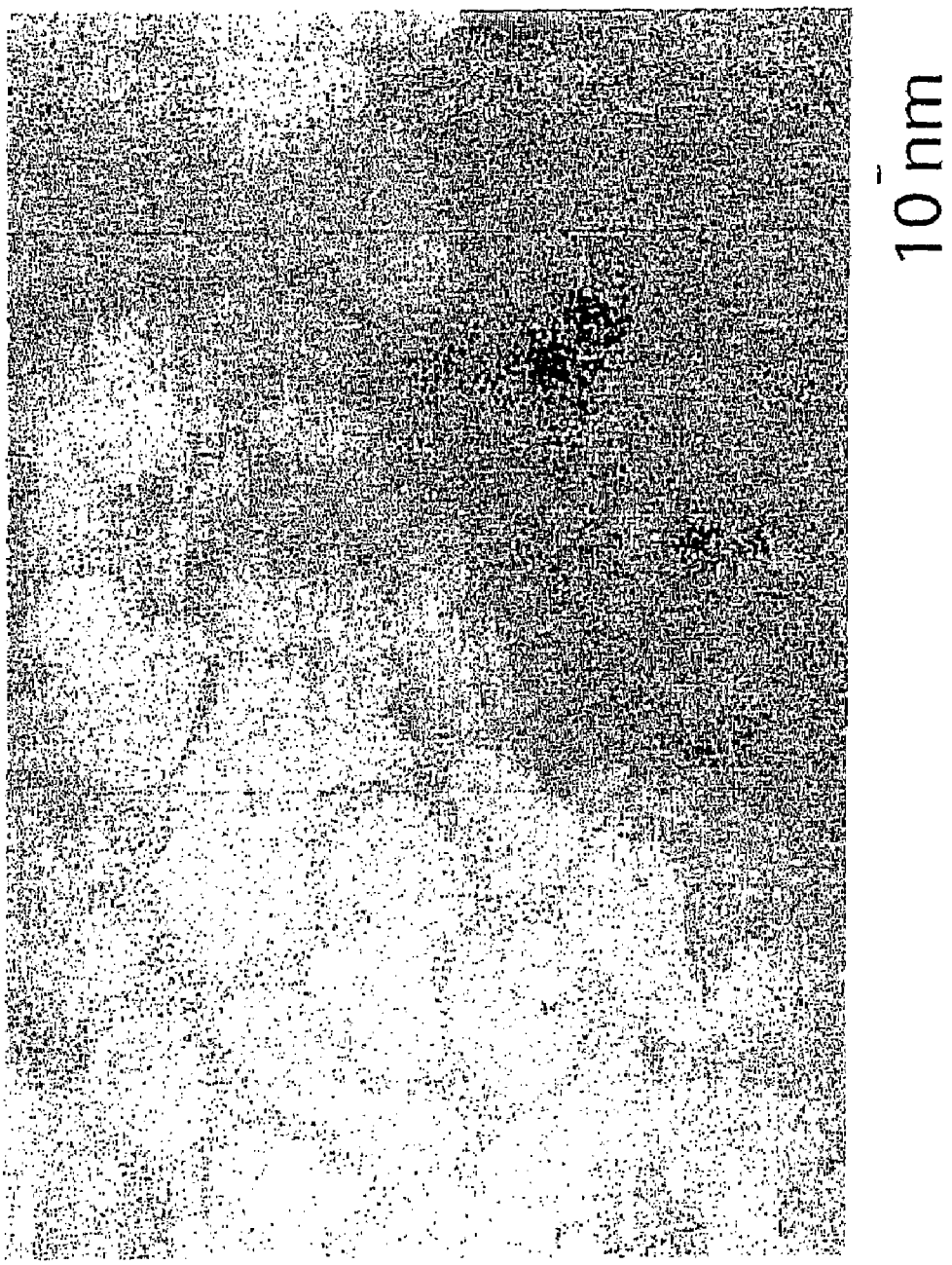
FIG. 5 depicts nanospheres of 14 nm obtained using anisole in place of THC to form the starting material in the experiment of Example 2.
Figure 6:
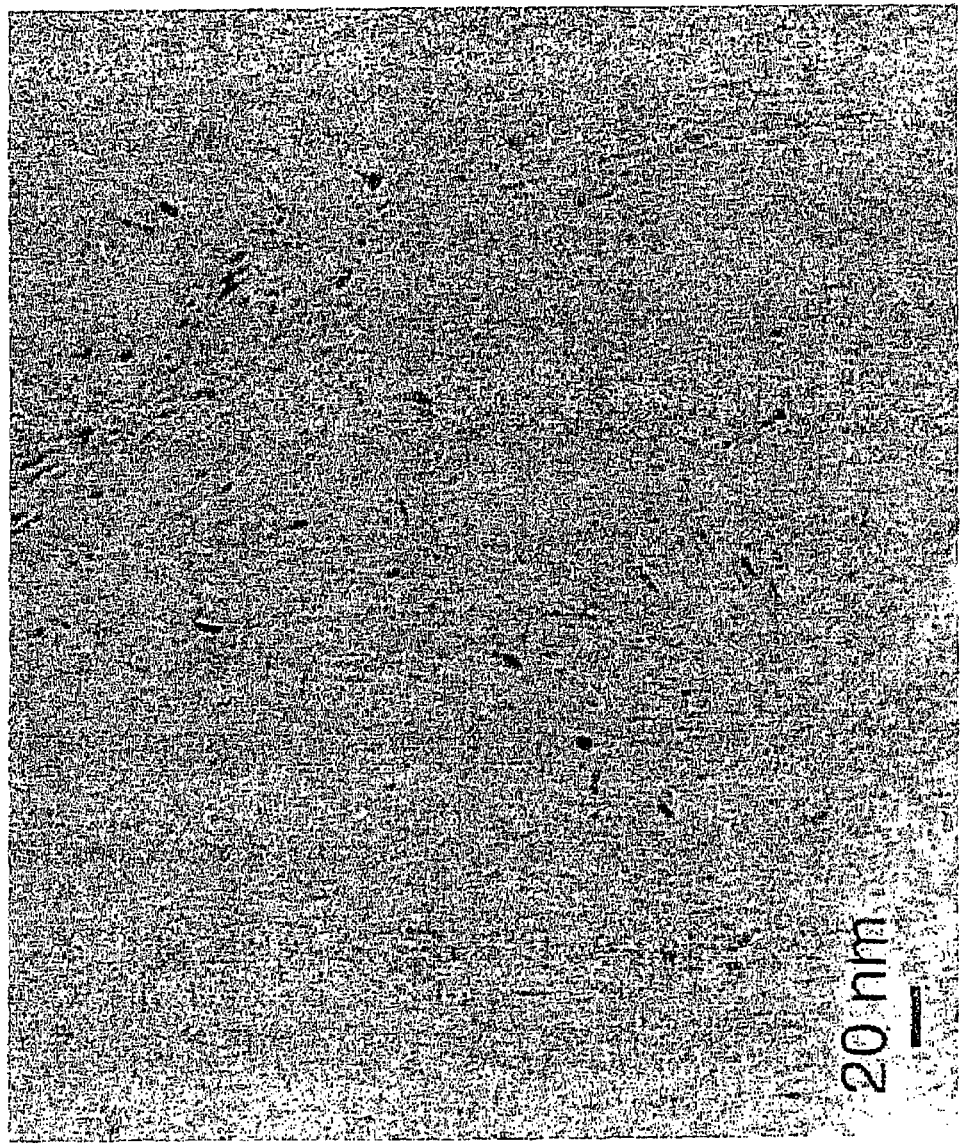
FIG. 6 depicts nanorods of 15 nm×5 nm obtained using HDA in the experiment of Example 2.

An equimolar (0.042 mol·l$^{-1}$) solution in THF of the zinc precursor, $ZnCy_2$, in the presence of the ligand hexadecylamine, HDA, is prepared in a Schlenck-type reactor under a controlled argon atmosphere. The solution is then left in the absence of light for 17 hours, without stirring, and then the reactor is opened and brought into contact with ambient air and humidity. When the THF has evaporated completely, a white solid is obtained. The solid can be dissolved again in several milliliters of THF, and a colloidal liquid solution is obtained. Under these conditions, nanorods having an average size of 10 nm×5 nm are obtained (FIG. 1). When this experiment is carried out under the same conditions but with a starting solution having a precursor concentration of 0.125 mol·l$^{-1}$, longer nanorod(s) (15 nm×5 nm) are obtained (FIG. 2).

EXAMPLE 2

In this Example, the effect of the chosen solvent on the resulting nanoparticles is evaluated.

The experiment of Example 1 (FIG. 1) is carried out under the same conditions but using toluene, heptane or anisole, respectively, in place of THF to form the starting solution. Nanosphere(s) of 13 nm (FIG. 3), 7 nm (FIG. 4) and 14 nm (FIG. 5), respectively, are obtained.

Figure 7:
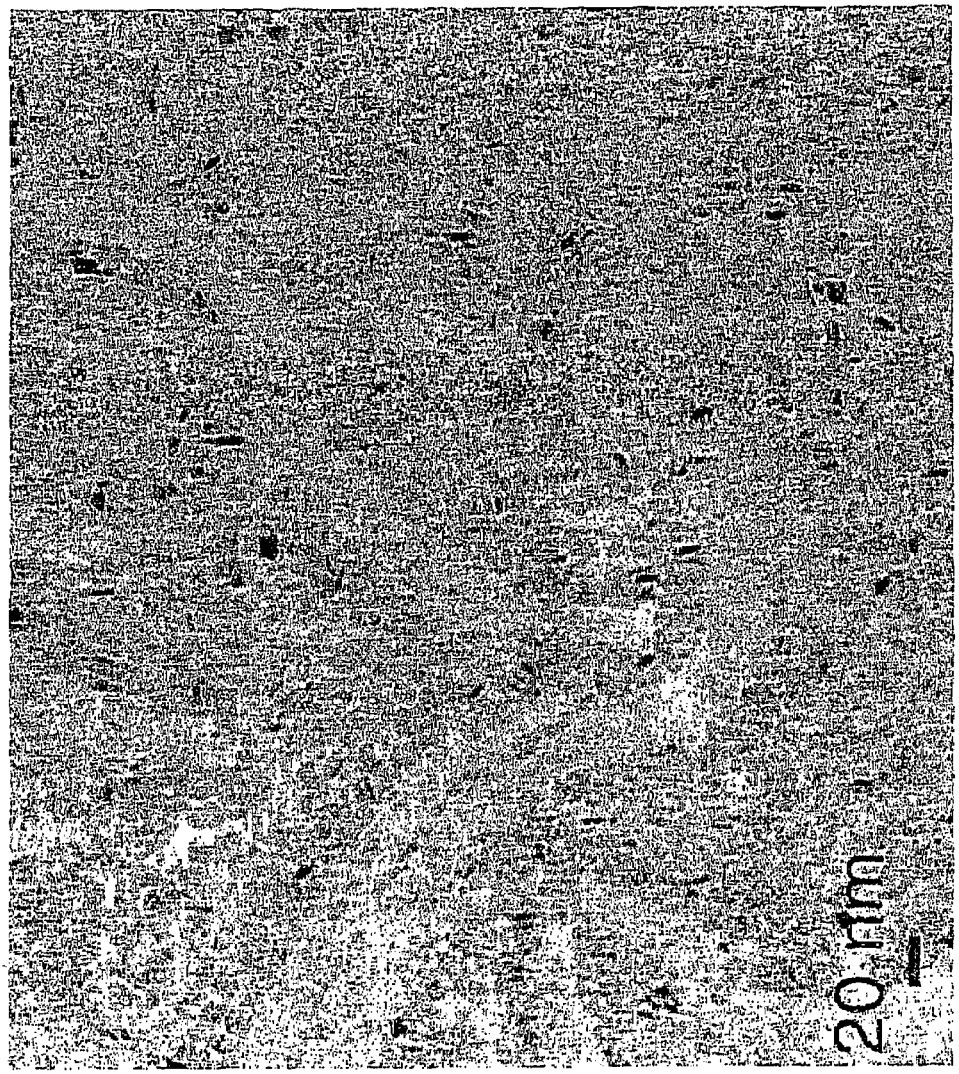
FIG. 7 depicts nanorods of 10 nm×3 nm obtained using octylamine (OA) in the experiment of Example 2.

It is to be noted that it is also possible to use a process according to the invention in the absence of solvent either if the ligand(s) used is(are) liquid, or if bringing the precursor into contact with the ligand(s) results in the formation of a liquid solution of an intermediate complex as it has been possible to demonstrate in the case of $ZnCy_2$ in the presence of ligand having an amine function for which it has been possible to identify a complex of the $ZnCy_2(RNH_2)$ type by NMR. In fact, the intermediate can have a melting point such that it is liquid at ambient temperature. Under the standard concentration conditions (0.042 mol·l$^{-1}$), with $ZnCy_2$ as precursor, and with different amines, it has been possible to synthesise nanorod(s). The length of these nanorod(s) depends on the length of the chain of the amine used as ligand. For example, in the case of HDA, nanorod(s) of 15 nm×2 nm have been obtained (FIG. 6), while in the case of octylamine, OA, nanorod(s) of 10 nm×3 nm have been synthesised (FIG. 7).

EXAMPLE 3

Figure 8:
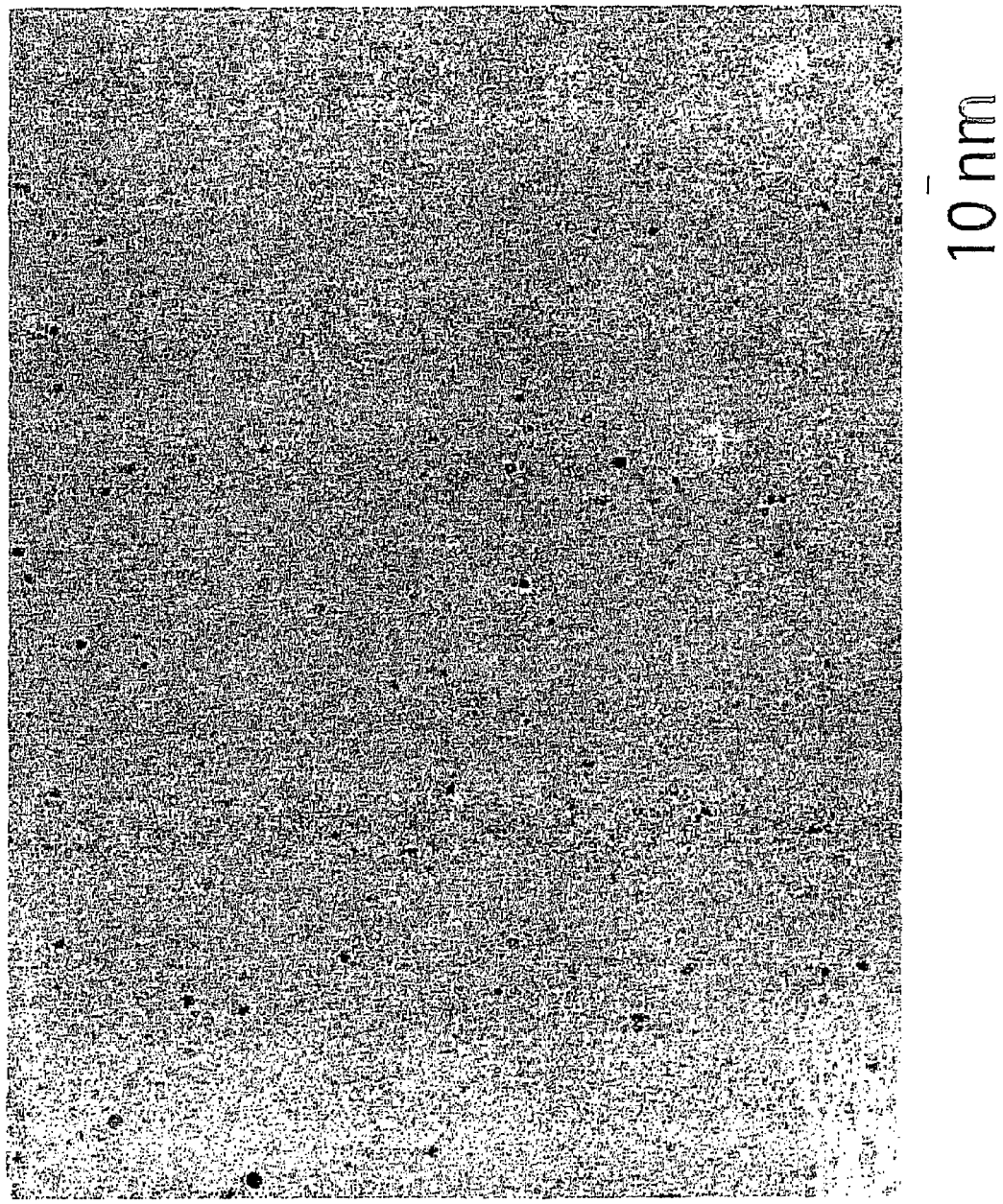
FIG. 8 depicts nanospheres having an average size of 9 nm obtained in the experiment of Example 3.
Figure 9:
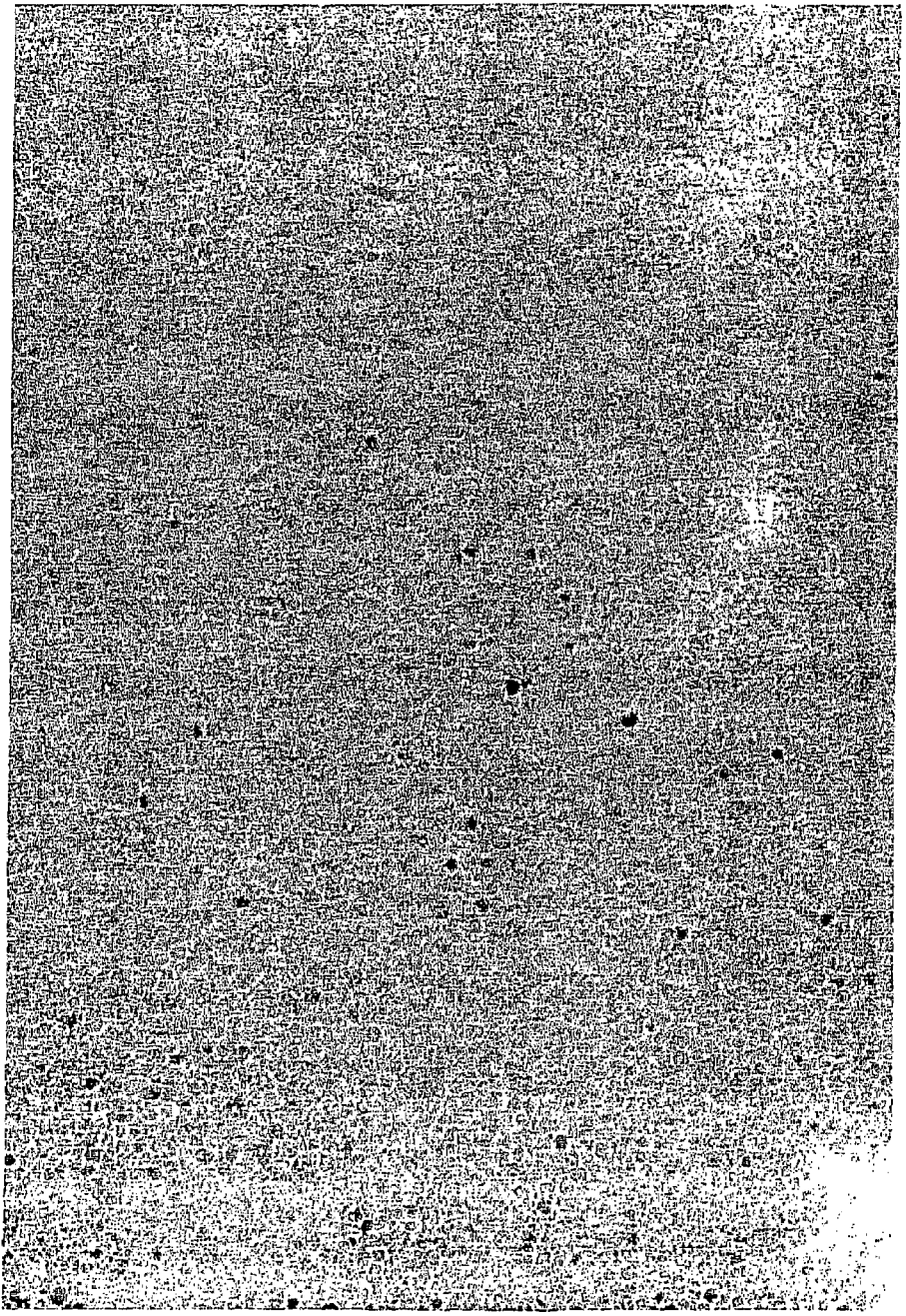
FIG. 9 depicts nanospheres of 12 nm obtained in the experiment of Example 3 but using octylamine (OA) as ligand.

In this Example, the effect of the length of the aliphatic chain of the ligand on the resulting nanoparticles is evaluated. In the case of HDA, nanorod(s) have been obtained, while nanosphere(s) have been obtained for shorter chain lengths. The ligand therefore affects the form of the nanoparticles. However, the chain length also influences the size of the nanoparticles. Accordingly, when the length of the aliphatic chain of the ligand diminishes, the size of the resulting nanosphere(s) increases. An equimolar (0.042 mol·l$^{-1}$) solution in THF of the zinc precursor, $ZnCy_2$, in the presence of the ligand dodecylamine, DDA, is prepared in a Schlenck-type reactor under a controlled argon atmosphere. The solution is then left in the absence of light for 17 hours, without stirring, and then the reactor is opened and brought into contact with ambient air and humidity. When the THF has evaporated completely, a white solid is obtained. The solid can be dissolved again in several milliliters of THF, and a colloidal liquid solution is obtained. Under these conditions, nanosphere(s) having an average size of 9 nm are obtained (FIG. 8). This experiment is repeated under the same conditions but with octylamine, OA, as ligand. Nanosphere(s) of 12 nm are then observed (FIG. 9).

EXAMPLE 4

Figure 10:
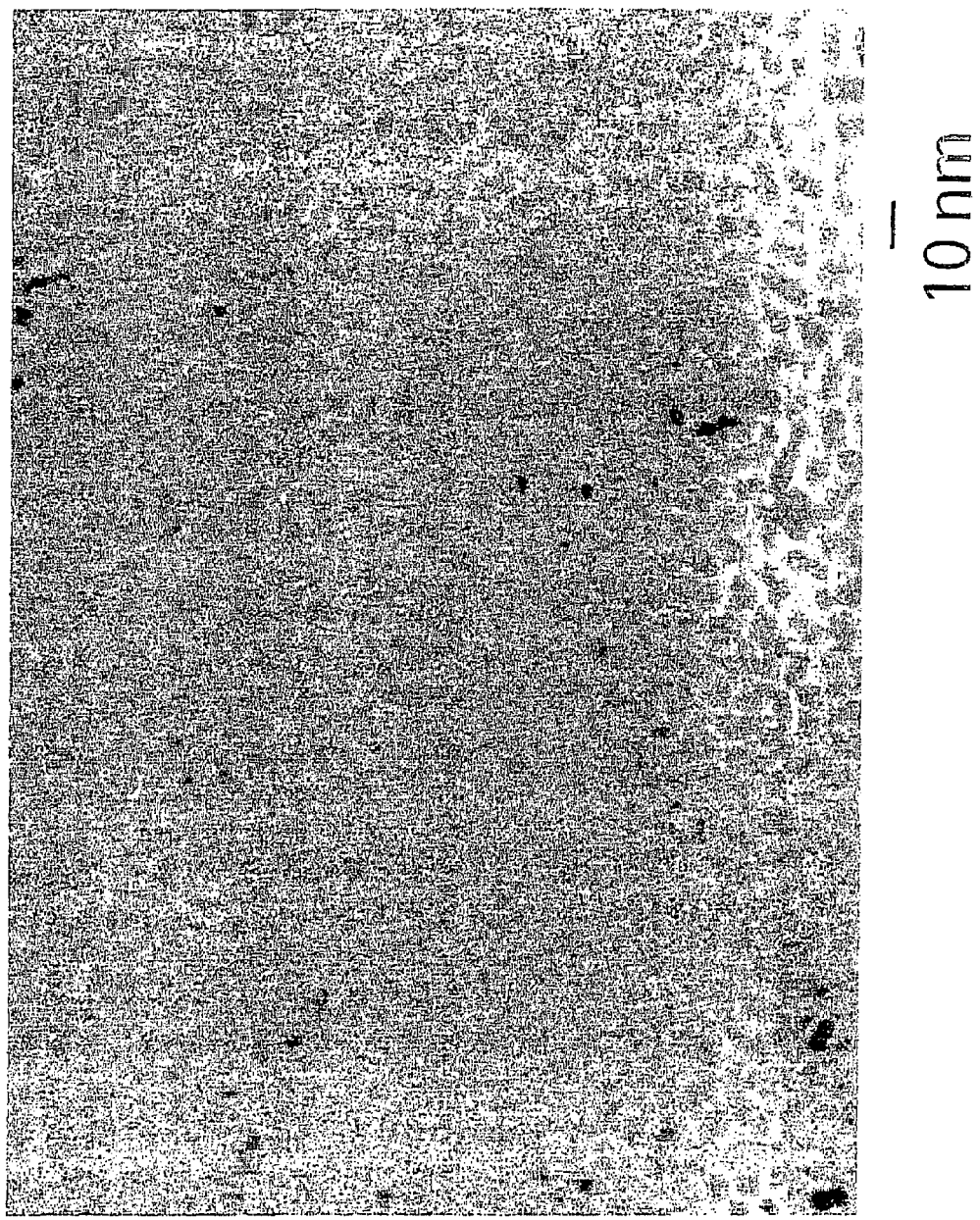
FIG. 10 depicts nanorods having an average size of 16 nm×7 nm obtained in the experiment of Example 4.

In this Example, the effect of the resting time d1 of the starting solution under an inert argon atmosphere (before oxidation) on the resulting nanoparticles is evaluated. This parameter affects the size of the nanoparticles. In Example 1, with the 0.042 mol·l$^{-1}$ solution and with d1=17 hours, nanorod(s) having an average size of 10 nm×5 nm are obtained (FIG. 1). This experiment is repeated under the same conditions but with a resting time d1 of zero. Nanorod(s) having an average size of 16 nm×7 nm are then obtained (FIG. 10).

EXAMPLE 5

Figure 11:
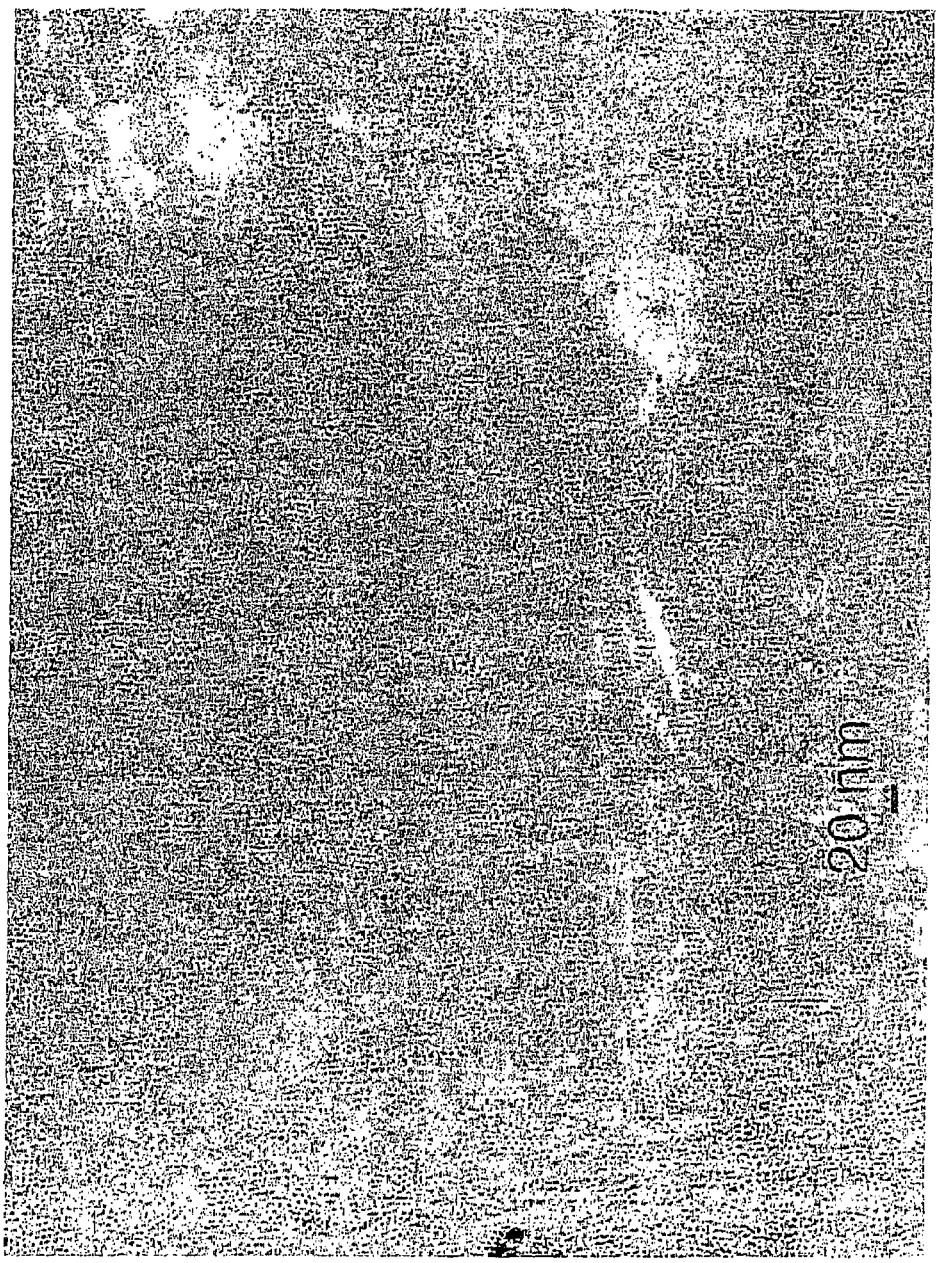
FIG. 11 depicts nanorods having an average size of 15 nm×5 nm obtained in the experiment of Example 5.

In this Example, the effect of the exposure time to ambient air and humidity on the resulting nanoparticles is evaluated. This parameter affects the homogeneity of the synthesised nanoparticles. For example, an equimolar (0.042 mol·l$^{-1}$) solution in THF of the zinc precursor, $ZnCy_2$, in the presence of the ligand hexadecylamine, HDA, is prepared in a Schlenck-type reactor under a controlled argon atmosphere. The solution is then left in the absence of light for 17 hours, without stirring, and then the reactor is opened and brought into contact with ambient air and humidity. At the end of 24 hours, evaporation is still not complete and the sample is composed both of 3 nm nanosphere(s) and of nanorod(s) of 5 nm×2 nm. After 72 hours, the sample is composed solely of nanorod(s) having an average size of 15 nm×5 nm (FIG. 11).

EXAMPLE 6

Figure 12:
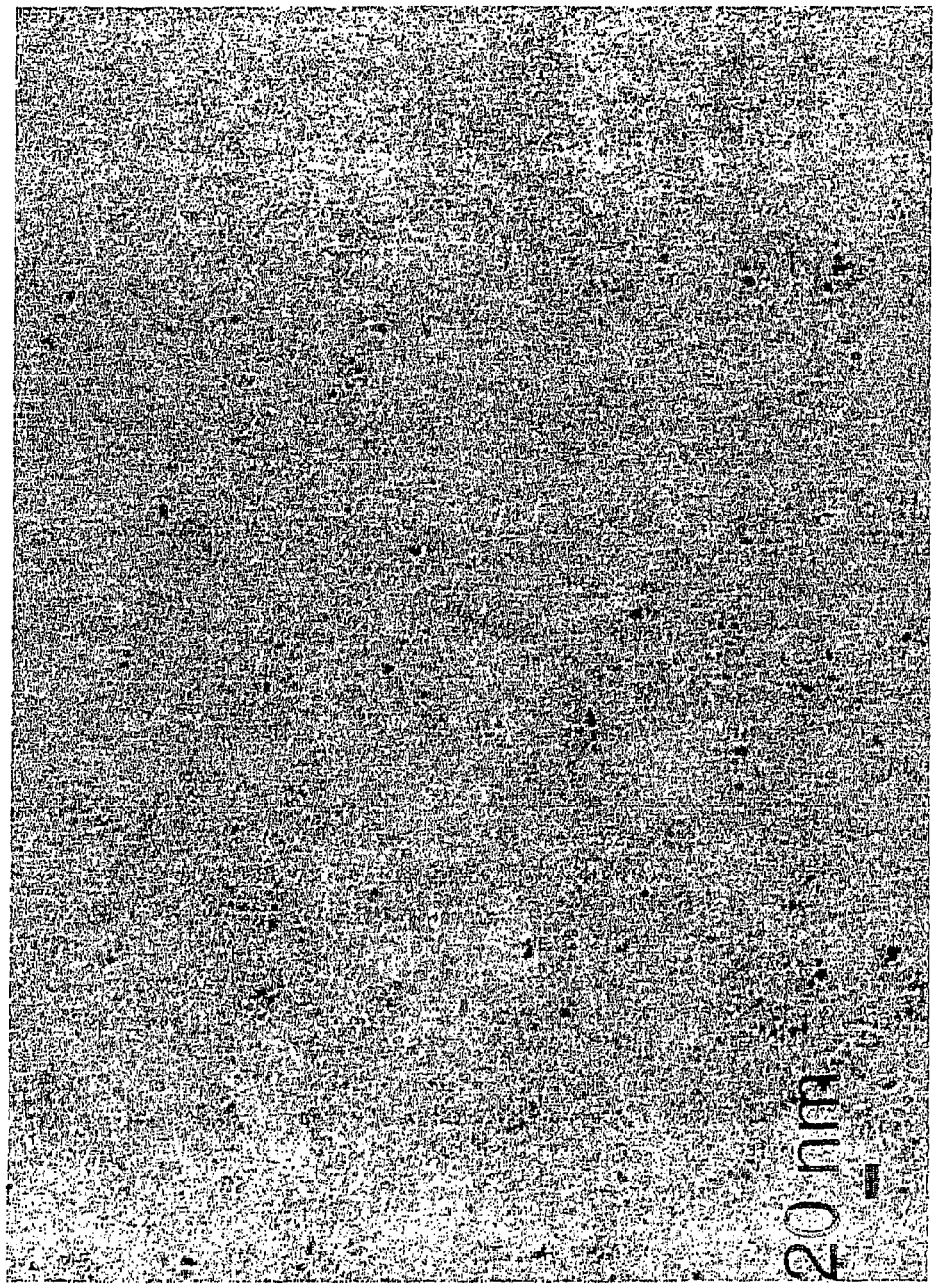
FIG. 12 depicts nanospheres of nm and nanorods of 10 nm×5 nm obtained in the experiment of Example 6.

In this Example, the effect of the reaction temperature on the resulting nanoparticles is evaluated. Examples 1 to 5 yield good results at ambient temperature. In the presence of a solvent (THF), the synthesised nanoparticles are less homogeneous and have a substantially smaller average size. Under the conditions of Example 2 (FIG. 6) at ambient temperature, nanorod(s) having an average size of 15 nm×2 nm are obtained. When this experiment is repeated under the same conditions but at a temperature of 46° C., the sample is composed both of 5 nm nanosphere(s) and of nanorod(s) of 10 nm×5 nm (FIG. 12).

EXAMPLE 7

Figure 13:
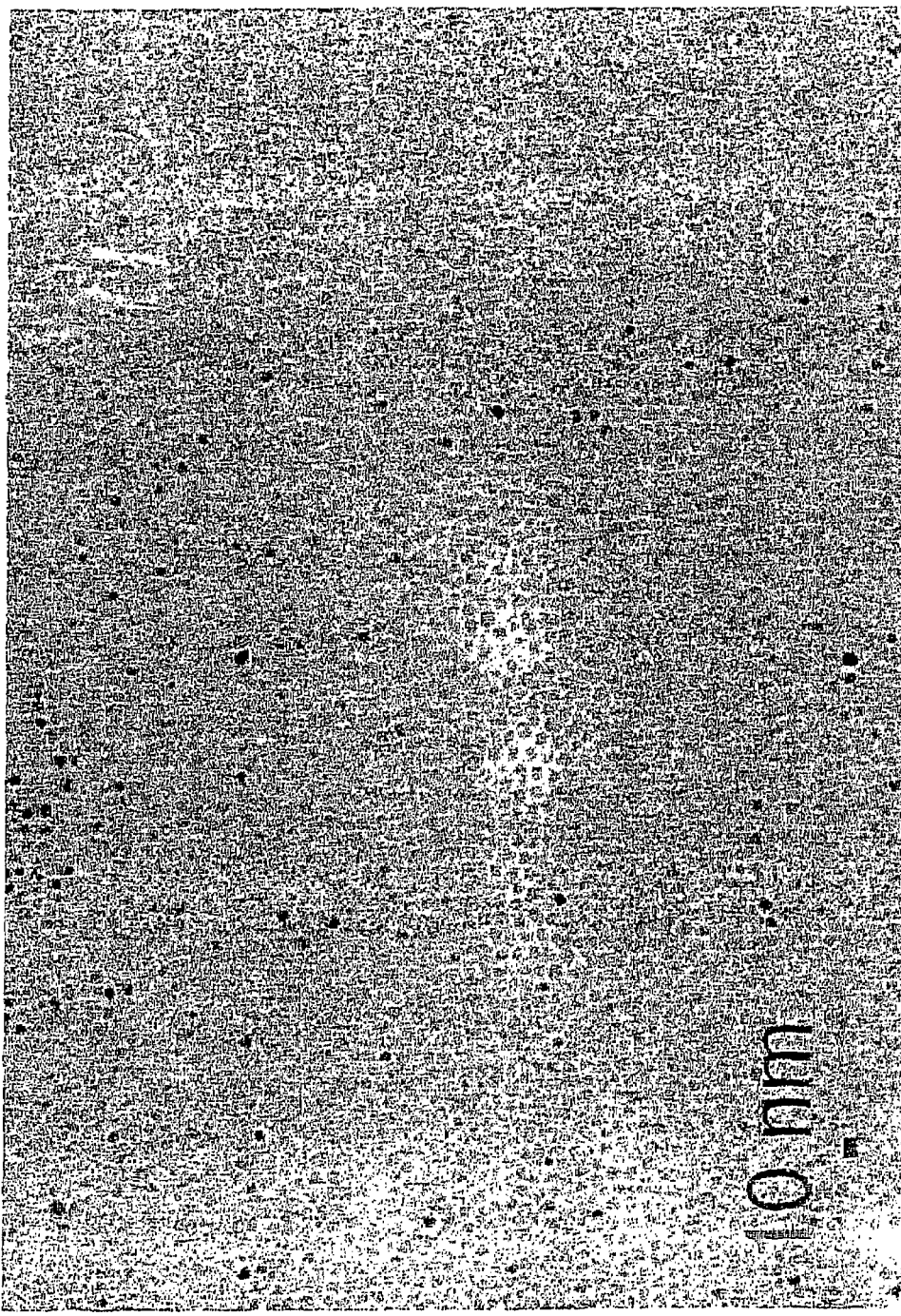
FIG. 13 depicts nanospheres of 7 nm obtained in the experiment of Example 7.

In this Example, the effect of the oxidation kinetics/evaporation of the solvent on the resulting nanoparticles is evaluated. This parameter affects both the form and the size of the synthesised nanoparticles. Under the conditions of Example 1 (FIG. 1), nanorod(s) having an average size of 10 nm×5 nm are obtained. When this experiment is repeated under the same conditions but equipping the reactor with a septum pierced by a cannula having a diameter of 1 mm and a length of 3 cm, both the oxidation kinetics and the evaporation of the solvent are much slower. After two weeks in solution, 7 nm nanosphere(s) are obtained (FIG. 13).

EXAMPLE 8

Tin Oxide

Figure 14:
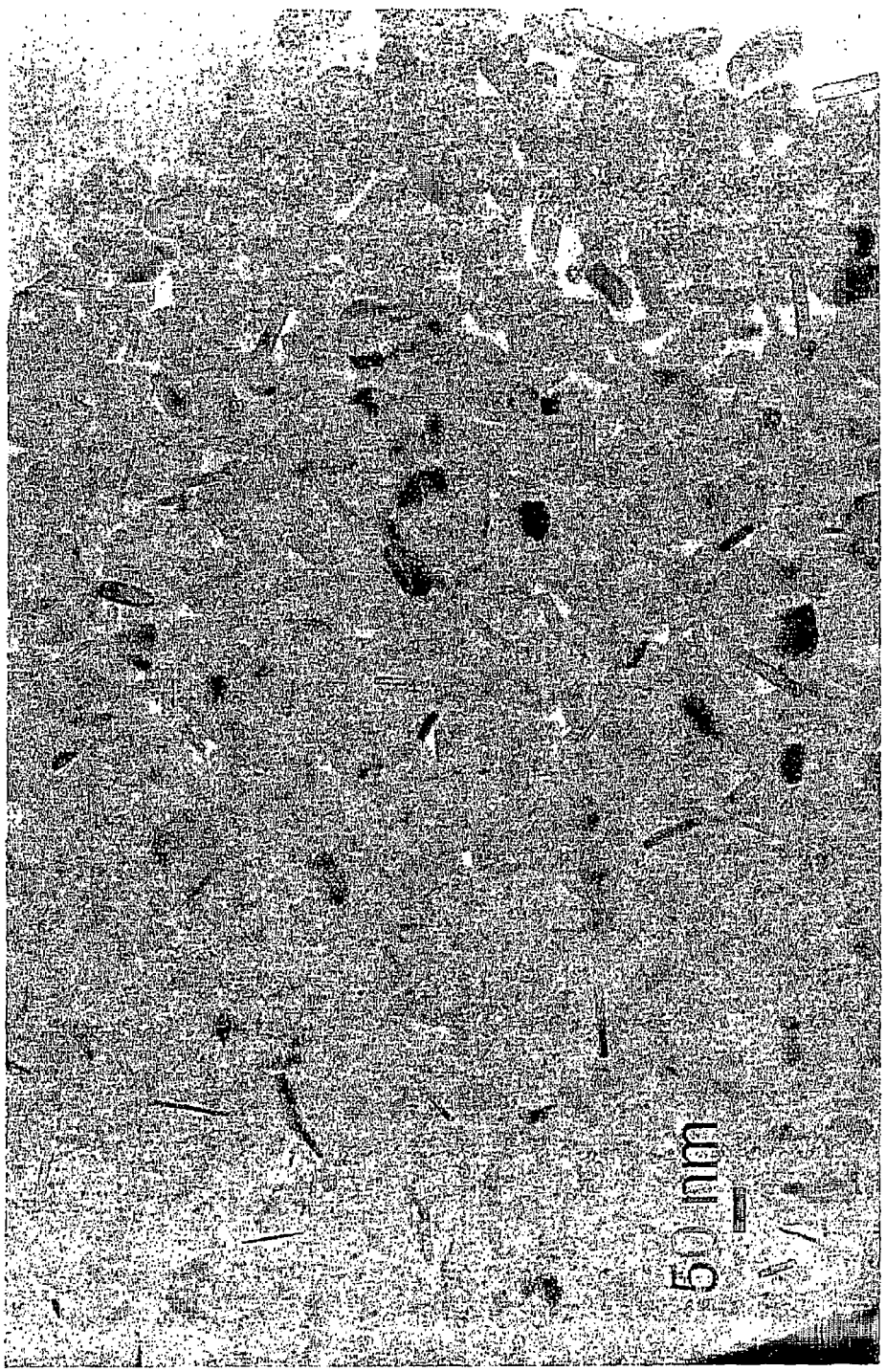
FIG. 14 depicts crystalline nanoparticles approximately 50 nm in size and having facets obtained in the experiment of Example 8.

An equimolar (0.042 mol·l$^{-1}$) solution in THF of the zinc precursor $[Sn(N(CH_3)_2)_2]_2$ in the presence of the ligand hexadecylamine, HDA, is prepared in a Schlenck-type reactor under a controlled argon atmosphere. The solution is then left in the absence of light for 17 hours, without stirring, and then the reactor is opened and brought into contact with ambient air and humidity. When the THF has evaporated completely, a white solid is obtained. The solid can be dissolved again in several milliliters of THF, and a colloidal liquid solution is obtained. Under these conditions, crystalline nanoparticles approximately 50 nm in size and having facets are obtained (FIG. 14).

EXAMPLE 9

Mixed Oxides

Figure 15:
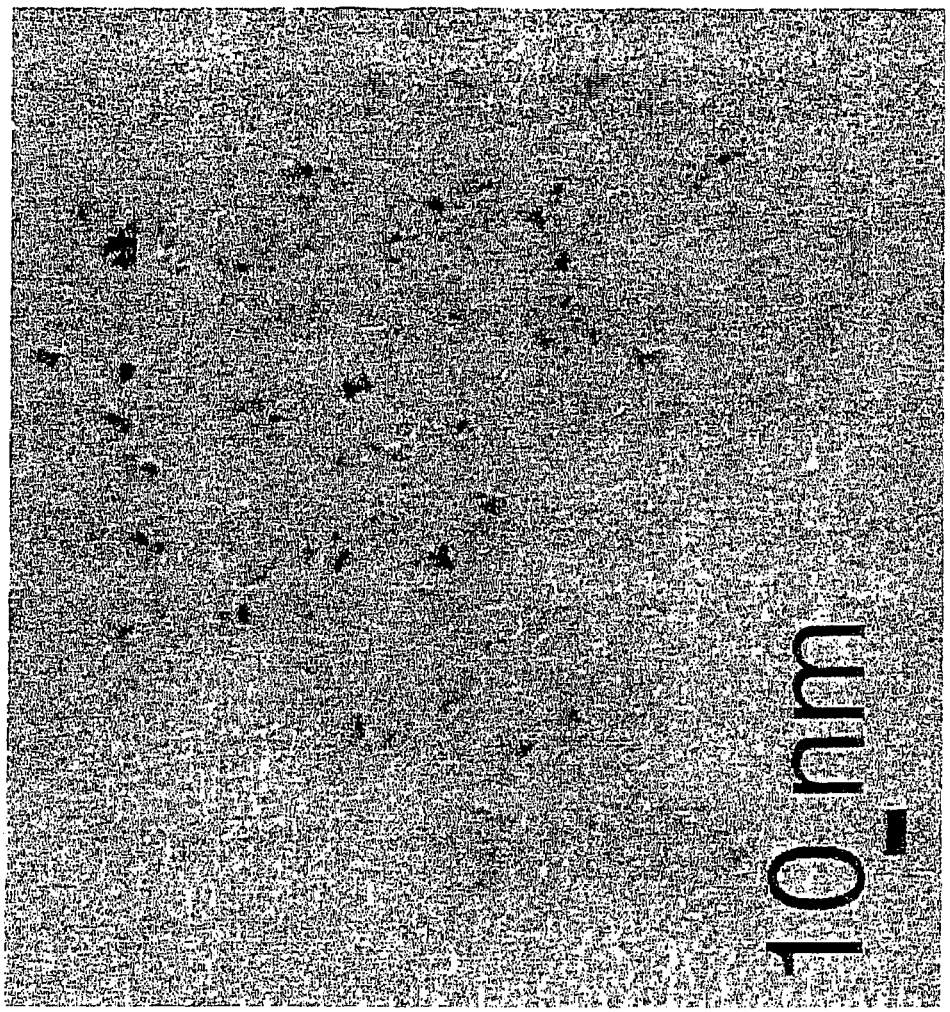
FIG. 15 depicts crystalline nanoparticles less than 10 nm in size and having facets obtained in the experiment of Example 9.

Mixed oxides are prepared by following the same procedure as in Example 8 using an equimolar solution in THF containing the zinc precursor, $ZnCy_2$ (0.021 mol·l$^{-1}$) and the tin precursor, $[Sn(N(CH_3)_2)_2]_2$ (0.021 mol·l$^{-1}$ in tin atom equivalents) in the presence of the ligand hexadecylamine, HDA (0.042 mol·l$^{-1}$). Under these conditions, crystalline nanoparticles less than 10 nm in size and having facets are obtained (FIG. 15).

EXAMPLE 10

Acid/Amine Mixture as Ligands

Figure 16:
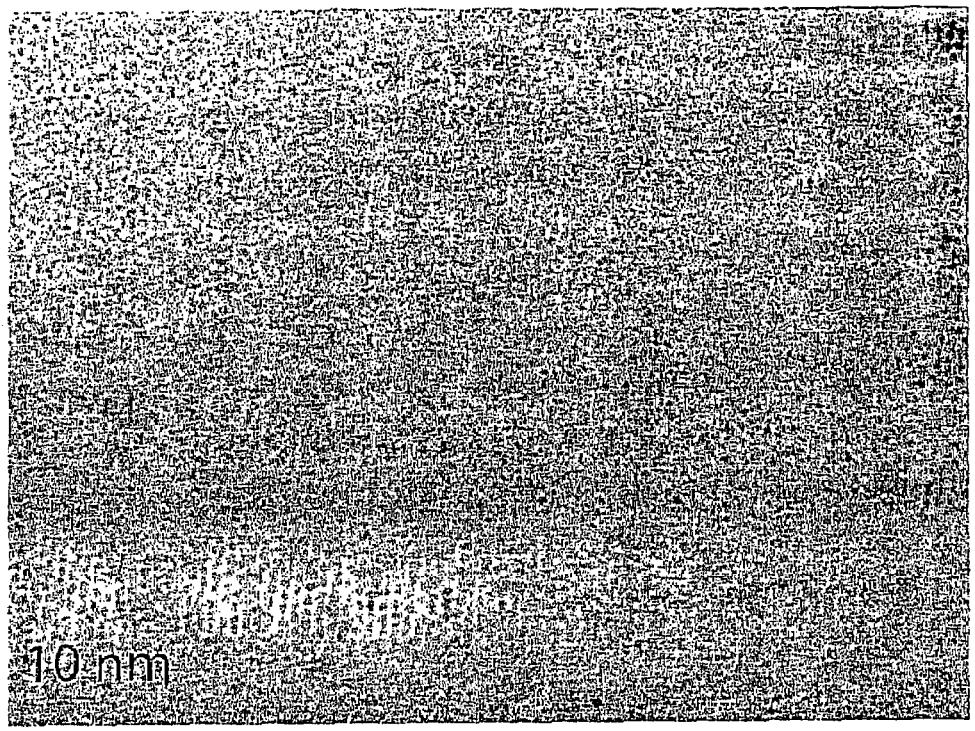
FIG. 16 depicts crystalline nanoparticles obtained in the experiment of Example 10.

A solution in THF containing the zinc precursor, $ZnCy_2$, in the presence of ligands comprising an amine (hexadecylamine, HDA, or octylamine, OA) and a carboxylic acid is prepared in a Schlenck-type reactor under a controlled argon atmosphere in the molar proportions precursor/amine/acid 1/1/0.5 and with a precursor concentration of 0.042 mol·l$^{-1}$. The solution is then left in the absence of light for 17 hours, without stirring, and then the reactor is opened and brought into contact with ambient air and humidity. When the THF has evaporated completely, a white solid is obtained. The solid can be dissolved again in a sufficient quantity of THF, and a colloidal liquid solution is obtained. Under these conditions, crystalline nanoparticles are obtained. FIG. 16 shows the results obtained with HDA.

The table below brings together the sizes of nanoparticles obtained for different acid/amine pairs in THF (in nm):

|     | octanoic acid | oleic acid | lauric acid |
| --- | --- | --- | --- |
| HDA | 3.5 | 3.1 | 2.8 |
| OA  | 3.2 | 3.7 | 3.2 |

The same acid/OA pairs were used in the absence of THF, and nanoparticles of ZnO were likewise obtained. In addition, different proportions of acid and amine have also been tested, and nanoparticles of ZnO were likewise obtained. The table below brings together the different proportions tested.

| $ZnCy_2$ | octylamine | oleic acid |
| --- | --- | --- |
| 1 | 2 | 1 |
| 1 | 2 | 0.5 |
| 1 | 5 | 2.5 |
| 1 | 5 | 0.5 |

EXAMPLE 11

Acid/Amine Mixture as Ligands, Preparation of Supercrystals of Particles

A solution in THF containing the zinc precursor, $ZnCy_2$, in the presence of the ligands hexadecylamine, HDA, and lauric acid, LA, is prepared in a Schlenck-type reactor under a controlled argon atmosphere in the proportions precursor/amine/acid 1/1/0.5 and with a precursor concentration of 0.042 mol·l$^{-1}$. The solution is then left in the absence of light for 17 hours, without stirring, and then the reactor is opened and brought into contact with ambient air and humidity. When the THF has evaporated completely, a white solid is obtained. The solid can be dissolved again in a sufficient quantity of THF to prepare the electron microscopy sample in such a manner that the supercrystals do not dissolve again. Under these conditions, supercrystals composed of crystalline nanoparticles of 2.8 nm are obtained (FIGS. 17a and 17b).

Figure 17A:
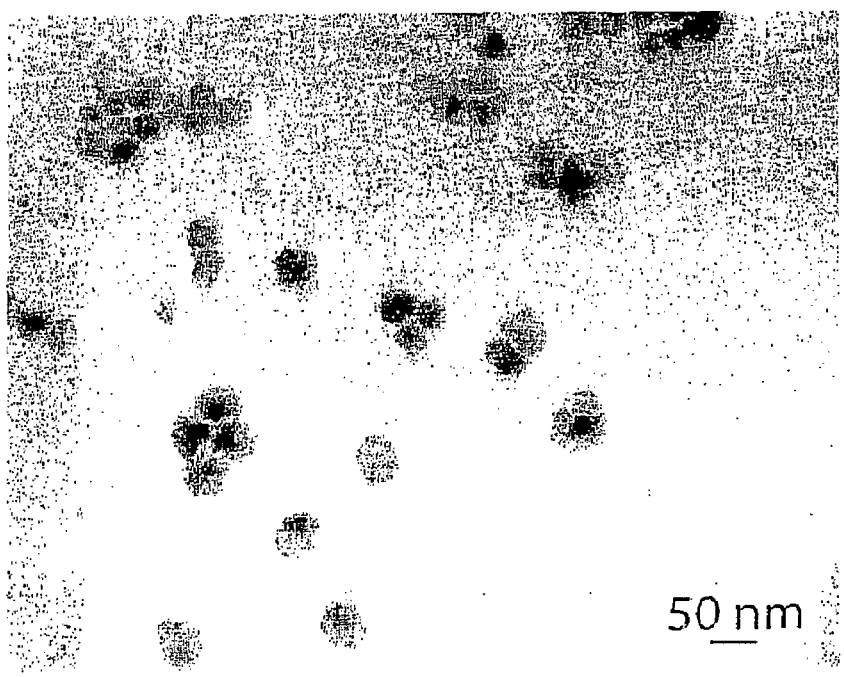
FIGS. 17a and 17b depict supercrystals composed of crystalline nanoparticles of 2.8 nm obtained in the experiment of Example 11.
Figure 17B:
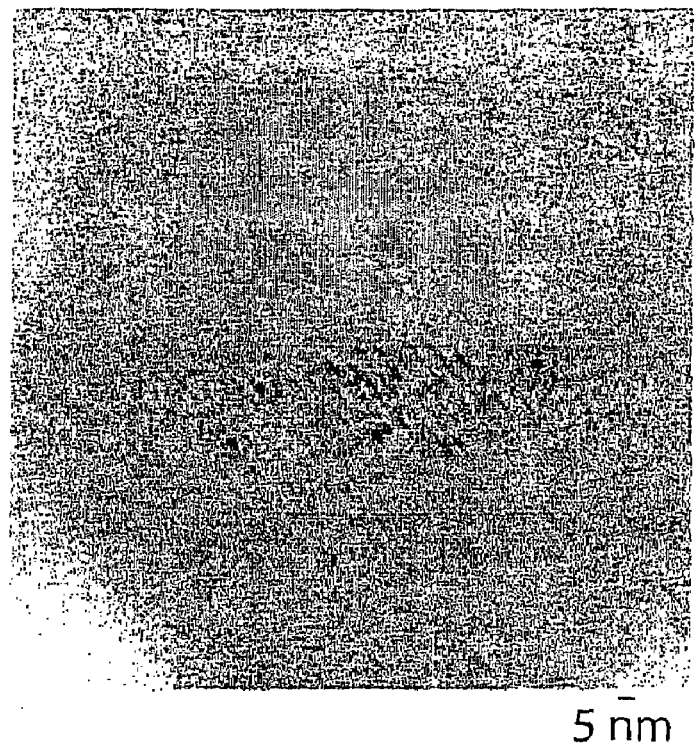

It is to be noted that when acid/amine ligands are used, supercrystals are obtained in all cases and it is the amount of solvent used to prepare the microscopy grating that permits the crystals to be re-dissolved and the particles to be obtained in the form of a layer (FIG. 16) or alternatively to retain the supercrystals (FIGS. 17a and 17b). These experiments were carried out with the following amines and acids: hexadecylamine HDA, dodecylamine DDA and octylamine OA coupled with octanoic acid OA, lauric acid LA and oleic acid OlA.

EXAMPLE 12

Indium Oxide

Figure 18:
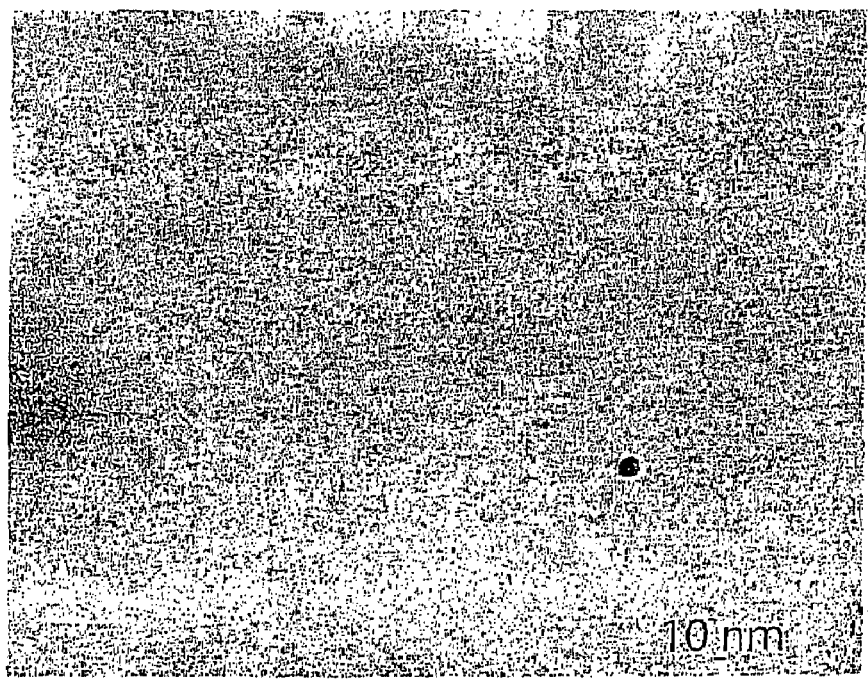
FIG. 18 depicts nanoparticles of indium oxide $In_2O_3$ of 4.8 nm obtained in the experiment of Example 12.

An equimolar (0.042 mol·l$^{-1}$) solution in THF of the indium precursor $In(C_5H_5)$ in the presence of the ligand hexadecylamine, HDA, is prepared in a Schlenck-type reactor under a controlled argon atmosphere. The solution is then left in the absence of light for 17 hours, without stirring, and then the reactor is opened and brought into contact with ambient air and humidity. When the THF has evaporated completely, an orange-brown solid is obtained. The solid can be dissolved again in several milliliters of THF, and a clear colloidal solution is obtained. Under these conditions, nanoparticles of indium oxide $In_2O_3$ of 4.8 nm are obtained (FIG. 18).

The invention claimed is:

1. A process for the preparation of a composition of nanoparticles of at least one crystalline metal oxide from at least one organometallic precursor, said process comprising:
   selecting at least one organometallic precursor that is spontaneously reactive to oxidation,
   producing a liquid solution of said at least one precursor in a non-aqueous solvent medium, and
   contacting said liquid solution with at least one oxidizing agent selected from the group consisting of water, ambient air, and pure dioxygen gas at ambient temperature to thereby directly bring about the production of nanoparticles of crystalline metal oxide(s),
   wherein said process does not involve thermal treatment to produce said nanoparticles of crystalline metal oxides.

2. The process as claimed in claim 1, wherein said solvent medium comprises at least one compound, called a ligand, selected from the group consisting of the bases and the acids.

3. The process as claimed in claim 2, wherein there is chosen at least one of said ligand that is not volatile at the reaction temperature and that acts as a dispersing agent for the composition produced in the solvent medium.

4. The process as claimed in claim 2, wherein an aliphatic organic compound is used as the ligand.

5. The process as claimed in claim 2, wherein an organic compound containing an unbranched aliphatic chain having from 6 to 20 carbon atoms is used as the ligand.

6. The process as claimed in claim 2, wherein at least one of said ligand is selected from the group consisting of the amines, the acids, the thiols, the phosphorus derivatives and the ethers.

7. The process as claimed in claim 2, wherein at least one of said ligand is selected from the group consisting of hexadecylamine, dodecylamine, octylamine, dodecylthiol, octanoic acid, oleic acid, and lauric acid.

8. The process as claimed in claim 2, wherein at least one base and at least one acid are chosen as the ligands.

9. The process as claimed in claim 2, wherein said solvent medium comprises at least one of said ligand and at least one compound that is volatile under the reaction conditions and gradually evaporates during the oxidation.

10. The process as claimed in claim 9, wherein said solvent medium is formed of THF and an aliphatic primary amine.

11. The process as claimed in claim 1, wherein said solvent medium comprises at least two separate compounds.

12. The process as claimed in claim 1, wherein said reaction conditions comprise carrying out the oxidation without stirring the liquid solution.

13. The process as claimed in claim 1, wherein said solvent medium is non-alcoholic.

14. The process as claimed in claim 1, wherein, for the preparation of nanoparticles of crystalline zinc oxide, zinc dicyclohexyl $Zn(C_6H_{11})_2$ is chosen as precursor.

15. The process as claimed in claim 1, wherein, for the preparation of nanoparticles of tin oxide, at least one organometallic precursor is selected from the group consisting of tin bis(bis(dimethylamide)) $[Sn(N(CH_3)_2)_2]_2$ and tin dicyclopentadienyl $Sn(C_5H_5)_2$.

16. The process as claimed in claim 1, wherein, for the preparation of indium oxide, indium cyclopentadienyl $In(C_5H_5)$ is chosen as precursor.

17. The process as claimed in claim 1, wherein, for the preparation of a mixed metal oxide, at least two separate precursors are chosen from the group consisting of zinc dicyclohexyl $Zn(C_6H_{11})_2$, tin bis(bis(dimethylamide) $[Sn(N(CH_3)_2)_2]_2$, tin dicyclopentadienyl $Sn(C_5H_5)_2$, and indium cyclopentadienyl $In(C_5H_5)$.

18. A process for the preparation of a composition of nanoparticles of at least one crystalline metal oxide from at least one organometallic precursor, said process consisting essentially of:
- selecting at least one organometallic precursor that is spontaneously reactive to oxidation,
- producing a liquid solution of said at least one precursor in a nonaqueous solvent medium, and
- contacting said liquid solution with at least one oxidizing agent at ambient temperature under reaction conditions chosen so as to directly bring about the production of nanoparticles of crystalline metal oxide(s),
- wherein said process does not involve thermal treatment to produce said nanoparticles of crystalline metal oxides.

* * * * *